(12) United States Patent
Taylor, Jr. et al.

(10) Patent No.: US 10,094,908 B2
(45) Date of Patent: *Oct. 9, 2018

(54) GEOLOCATION WITH RADIO-FREQUENCY RANGING

(71) Applicant: ENSCO, Inc., Falls Church, VA (US)

(72) Inventors: David W. A. Taylor, Jr., Greensboro, NC (US); Bradley David Farnsworth, Morristown, NJ (US); William Todd Faulkner, Sylva, NC (US)

(73) Assignee: ENSCO, INC., Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/584,475

(22) Filed: May 2, 2017

(65) Prior Publication Data
US 2017/0234965 A1    Aug. 17, 2017

Related U.S. Application Data

(63) Continuation of application No. 13/803,587, filed on Mar. 14, 2013, now Pat. No. 9,766,322.

(51) Int. Cl.
*G08B 1/08* (2006.01)
*G01S 5/14* (2006.01)
(Continued)

(52) U.S. Cl.
CPC ............... *G01S 5/14* (2013.01); *G01S 5/0226* (2013.01); *G01S 5/0289* (2013.01); *G01S 5/10* (2013.01); *G01S 11/02* (2013.01)

(58) Field of Classification Search
None
See application file for complete search history.

(56) References Cited

U.S. PATENT DOCUMENTS

| 4,768,202 A * | 8/1988 | Lacroix ............... H04B 17/406 178/71.14 |
| 5,278,563 A | 1/1994 | Spiess |
| | (Continued) | |

OTHER PUBLICATIONS

Amer Catovic and Azfer Sahinoglu, "The Cramer-Rao Bounds of Hybrid TOA/RSS and TDO/RSS Location Estimations Schemes," TR-2003-143, Mitsibushi Electronic Research Laboratory, Jan. 2004.

(Continued)

*Primary Examiner* — Curtis King
(74) *Attorney, Agent, or Firm* — Finnegan, Henderson, Farabow, Garrett & Dunner, L.L.P.

(57) ABSTRACT

A geolocation system includes an originator device configured to transmit a first wireless signal to a transponder device. The transponder device is configured to transmit a second wireless signal to the originator device. The system includes at least one observer device configured to receive the first wireless signal from the originator device and receive the second wireless signal from the transponder device. The system also includes a first processor configured to calculate a transactional difference range at the at least one observer device based on the first wireless signal received at the observer device and the second wireless signal received at the observer device. A corrected transactional difference range value may be calculated by subtracting a time-of-flight of the first wireless signal from the originator device to the transponder device from the transactional difference range. A method of performing geolocation using a transactional difference range is also disclosed.

27 Claims, 15 Drawing Sheets

(51) Int. Cl.
  *G01S 5/10* (2006.01)
  *G01S 5/02* (2010.01)
  *G01S 11/02* (2010.01)

(56) References Cited

U.S. PATENT DOCUMENTS

| | | | |
|---|---|---|---|
| 5,400,031 A * | 3/1995 | Fitts | G01S 13/767 342/36 |
| 5,416,468 A * | 5/1995 | Baumann | G08B 21/22 340/539.1 |
| 6,054,950 A | 4/2000 | Fontana | |
| 6,122,329 A | 9/2000 | Zai et al. | |
| 6,380,894 B1 * | 4/2002 | Boyd | G01S 5/02 342/450 |
| 6,469,654 B1 | 10/2002 | Winner et al. | |
| 6,594,617 B2 | 7/2003 | Scherzinger | |
| 6,633,235 B1 * | 10/2003 | Hsu | G08C 19/28 340/12.25 |
| 6,839,035 B1 * | 1/2005 | Addonisio | G06K 7/10178 340/572.1 |
| 7,239,277 B2 | 7/2007 | Fullerton et al. | |
| 7,606,530 B1 * | 10/2009 | Anderson | G06K 7/10178 455/41.2 |
| 8,199,047 B2 | 6/2012 | Fretenburg et al. | |
| 8,224,575 B2 | 7/2012 | Faulkner et al. | |
| 8,228,171 B2 * | 7/2012 | Bauchot | G01S 5/0289 235/385 |
| 8,274,426 B2 | 9/2012 | Lee | |
| 8,314,731 B2 | 11/2012 | Fretenburg et al. | |
| 8,380,218 B2 | 2/2013 | Gfeller et al. | |
| 8,473,241 B2 | 6/2013 | Foxlin | |
| 8,583,145 B2 | 11/2013 | Karr et al. | |
| 8,624,722 B2 * | 1/2014 | Miller | G01S 5/0215 340/539.1 |
| 8,862,394 B2 | 10/2014 | Taylor, Jr. et al. | |
| 2002/0101912 A1 | 8/2002 | Phelts et al. | |
| 2002/0143491 A1 | 10/2002 | Scherzinger | |
| 2005/0099333 A1 | 5/2005 | Gila et al. | |
| 2006/0071756 A1 * | 4/2006 | Steeves | G06K 7/10108 340/10.1 |
| 2006/0214848 A1 | 9/2006 | Roberts | |
| 2007/0001809 A1 * | 1/2007 | Kodukula | G06K 7/0008 340/10.1 |
| 2007/0008139 A1 * | 1/2007 | Saarisalo | G06K 7/0008 340/572.7 |
| 2007/0008140 A1 * | 1/2007 | Saarisalo | G06K 7/0008 340/572.7 |
| 2007/0051809 A1 * | 3/2007 | Takahashi | G06K 7/0008 235/451 |
| 2007/0080804 A1 * | 4/2007 | Hirahara | G06K 7/0008 340/572.1 |
| 2007/0146138 A1 * | 6/2007 | Phipps | G06K 7/0008 340/572.7 |
| 2007/0222603 A1 * | 9/2007 | Lai | G06K 7/0008 340/572.7 |
| 2007/0222604 A1 * | 9/2007 | Phipps | G06K 7/0008 340/572.7 |
| 2007/0222606 A1 * | 9/2007 | Phipps | G06K 7/0008 340/572.7 |
| 2007/0257836 A1 | 11/2007 | Chaplin | |
| 2007/0285245 A1 * | 12/2007 | Djuric | G08B 13/1427 340/572.1 |
| 2008/0036594 A1 * | 2/2008 | Kates | A01K 15/02 340/541 |
| 2008/0074263 A1 * | 3/2008 | Rofougaran | G06K 7/0008 340/572.1 |
| 2008/0077326 A1 | 3/2008 | Funk et al. | |
| 2008/0165058 A1 * | 7/2008 | Ayachitula | G01S 7/4021 342/359 |
| 2009/0033465 A1 * | 2/2009 | Mickle | G06K 7/10178 340/10.1 |
| 2009/0111616 A1 | 4/2009 | Creelman | |
| 2010/0225541 A1 | 9/2010 | Hertzog et al. | |
| 2011/0125063 A1 | 5/2011 | Shalon et al. | |
| 2011/0238308 A1 | 9/2011 | Miller et al. | |
| 2011/0273334 A1 | 11/2011 | Karr | |
| 2012/0133558 A1 | 5/2012 | Fretenburg et al. | |
| 2012/0177088 A1 | 7/2012 | Bonin et al. | |
| 2012/0242481 A1 * | 9/2012 | Gernandt | G06K 19/0705 340/539.13 |
| 2012/0326842 A1 * | 12/2012 | Grinberg | G06K 7/10178 340/10.1 |
| 2013/0122803 A1 * | 5/2013 | Forster | G06K 7/10009 455/11.1 |
| 2013/0130843 A1 | 5/2013 | Burroughs et al. | |
| 2013/0207781 A1 * | 8/2013 | Pagani | G06K 7/10178 340/10.1 |
| 2014/0203970 A1 | 7/2014 | Taylor, Jr. et al. | |
| 2014/0203971 A1 | 7/2014 | Taylor, Jr. et al. | |
| 2014/0207374 A1 | 7/2014 | Taylor, Jr. et al. | |
| 2014/0240125 A1 * | 8/2014 | Burch | G08B 21/0213 340/539.13 |
| 2014/0248841 A1 | 9/2014 | Kluge et al. | |
| 2015/0116146 A1 | 4/2015 | Dickman | |
| 2015/0296348 A1 | 10/2015 | Ghabra | |
| 2015/0312712 A1 | 10/2015 | Vock et al. | |
| 2017/0351886 A1 * | 12/2017 | Recouly | G06K 7/10178 |

OTHER PUBLICATIONS

Belostotski, L, et al., "Distance Measurement with Phase-Stable CW Radio Link Using the Chinese Remainder Theorem", Electronics Letters, vol. 37, No. 8, Apr. 12, 2001, pp. 521-522.

Belostotski. L., et al., "A Technique for Microwave Ranging and Remote Phase Synchronization", IEEE Transactions on Instrumentation and Measurement, vol. 51, No. 3, Jun. 2002, pp. 551-559.

Brand, Timothy, et al., "Foot-to-Foot Range Measurement as an Aid to Personal Navigation", ION 59$^{th}$ Annual Meeting/CIGTF 22$^{nd}$ Guidance Test Symposium, Jun. 23-25, 2003, Albuquerque, NM, pp. 113-121.

Brown III, D. Richard, et al., "Time-Slotted Round-Trip Carrier Synchronization for Distributed Beamforming", IEEE Transactions on Signal Processing, vol. 56, No. 11, Nov. 2008, pp. 5630-5643.

"Carrier Recovery," Webpage, Available at http://en.wikipedia.org/wiki/Carrier_recovery, Lasat Downloaded Dec. 20, 2013.

Duncan, Juan Carlos Merlano, "Phase Synchronization Scheme for Very Long Baseline Coherent Arrays", Department of Signal Theory and Communications, Barcelona, Jul. 2012.

Foxlin, Eric, "Pedestrian Tracking with Shoe-Mounted Inertial Sensors", IEEE Computer Society, Nov./Dec. 2005, pp. 38-46.

Keller, Michael, "GPS-Free Tech Can Track Miners' and Soldiers' Boots Underground", Scientific American, 2012.

Kelly, Alonzo, "Personal Navigation System Based on Dual Shoe-Mounted IMUs and Intershoe Ranging", Personal Precision Locator Workshop, Aug. 1, 2011, pp. 1-28.

Laverne, Michel, et al., "Experimental Validation of Foot to Foot Range Measurements in Pedestrian Tracking", Proceedings of the 24$^{th}$ International Technical Meeting of the Satellite Division of the Institute of Navigation (ION GNSS 2011), Sep. 2011.

"Real Time Kinematic," Webpage, Available at en.wikipedia.org/wiki/Real_Time_Kinematic, Last Downloaded Dec. 20, 2013.

* cited by examiner

GEOLOCATION WITH RADIO-FREQUENCY RANGING

CROSS REFERENCE TO RELATED APPLICATION

This application is a continuation of U.S. application Ser. No. 13/803,587, filed Mar. 14, 2013, the subject matter of each of which is incorporated herein by reference in its entirety.

BACKGROUND

Technical Field

This disclosure relates to geolocation with radio-frequency ranging.

Description of Related Art

Radio-frequency (RF) ranging technology provides distance and relative position between objects without the need to take mechanical measurements. RF ranging systems calculate the distance between two objects based in part on the time a radio signal propagates between those objects. In air, radio signals propagate at a constant rate, roughly equal to the speed of light.

Knowing the absolute position of a sufficient number of objects (such as e.g., cell phone towers fixed relative to the earth), an RF ranging system can be used to determine the absolute position of other objects. An RF ranging system may utilize a signal from the Global Positioning System (GPS) to provide absolute location. In many situations, however, GPS signals are either unavailable or actively denied to a potential user. RF ranging systems can provide accurate information regarding distance and/or location even in locations or situations without access to GPS signals. Some positioning systems, for example, GPS-based systems measure a time-difference of arrival (TDOA) of several synchronized signals to aid in position calculations.

RF ranging systems may utilize a round-trip time-of-flight ("RTTOF") measurement to compute the distance between two radios. These types of systems can be further classified into "round-trip full-duplex" configurations and "round-trip half-duplex" configurations. In a round-trip full-duplex configuration, a first radio transmits a signal to a second radio, which then retransmits the same signal back to the first radio without performing any calculations using the signal. After receiving the retransmitted signal from the second radio, the first radio compares the departure time to the arrival time to calculate the round-trip signal propagation time. The system multiplies this time by the speed of light and divides by two to estimate the distance between the two radios.

In a round-trip half-duplex configuration, a first radio transmits a signal to a second radio, which then performs calculations using that signal. The second radio then transmits a new signal, which often contains the results of the calculations performed by the second radio, back to the first radio. The first radio then utilizes the data from the second radio and other data within the first radio to calculate the round-trip signal propagation time. The system multiplies this time by the speed of light and divides by two to estimate the distance between the two radios.

An improved RF-ranging technique is disclosed in U.S. Pat. Nos. 8,199,047 and 8,314,731 (which are assigned to the same assignee as the present patent application), the disclosures of which are hereby incorporated by reference in their entirety.

In many position determining systems, it is difficult to determine and track the positions of many objects simultaneously. This is often because several RTTOF measurements must be coordinated with each object being tracked and because systems often use synchronized clocks, which can be expensive to implement.

As used herein, a "radio" refers to a device that radiates, emits, transmits and/or receives electromagnetic signals (such as RF signals). Such devices may be generally referred to as "emitters," "transmitters," receivers," or "transceivers" in the art and may radiate, emit, transmit, and/or receive electromagnetic signals. Radios may also include multiple-input, multiple-output (MIMO) devices. Such devices may be metallic or non-metallic and may include one or more radiating elements, emitting elements, transmitting elements, receiving elements, and/or transceiving elements, depending on the type of signal being radiated, emitted, transmitted or received.

When determining the position of an object, calculations may be performed by a data processor. The calculations may inherently produce finite errors in the real-time estimates of the position, velocity, and attitude, collectively known as "navigation errors." If uncorrected, these errors grow unbounded with time. To help bound the navigation errors, it is common in the art to employ various filtering techniques. One class of filters is known as Kalman filters. The term "Kalman filter" will be used to collectively refer to members and variants in this class of filters, including but not limited to extended Kalman filters (EKF) and unscented Kalman filters (UKF). Another class of filters includes particle filters.

There remains a need for an improved geolocation system and/or method to allow more accurate computation of the current or real-time position of objects.

SUMMARY

The present disclosure discusses a system and method for geolocation with radio-frequency ranging.

According to an aspect of the this disclosure, a system includes an originator device configured to transmit a first wireless signal to a transponder device, the transponder device is configured to transmit a second wireless signal to the originator device, and at least one observer device configured to receive the first wireless signal from the originator device and receive the second wireless signal from the transponder device. The system also includes at least one processor configured to calculate a transactional difference range at the at least one observer device based on the first wireless signal received at the observer device and the second wireless signal received at the observer device. The originator device may include a second processor configured to calculate a round-trip time-of-flight measurement between the originator device and the transponder device using the first wireless signal and the second wireless signal. The first wireless signal may include a measurement request packet, and the second wireless signal may include a measurement reply packet. The measurement request packet may include a destination address corresponding to an identifier for the transponder device, and the measurement reply packet may include a destination address corresponding to an identifier for the originator device.

According to another aspect of this disclosure, the at least one processor may be configured to calculate the transactional difference range at the observer device by calculating a time difference of arrival at the observer device based on when the first wireless signal is received at the observer device and when the second wireless signal is received at the observer device.

According to still another aspect of this disclosure, the at least one processor may be configured to calculate the transactional difference range at the observer device by measuring an observer time difference, corresponding to the time period between receiving the first wireless signal at the observer device and receiving the second wireless signal at the observer device, measuring a first phase value, corresponding to the phase of the first wireless signal received at the observer device, and measuring a second phase value, corresponding to the phase of the second wireless signal received at the observer device. The at least one processor may be further configured to calculate a corrected transactional difference range value at the observer device by calculating the transactional difference range by adding the observer time difference and the first phase value, subtracting the second phase value, and subtracting a turn-around time for the transponder device to determine the transactional difference range, wherein the turn-around time corresponds to the difference in time between when the transponder device receives the first wireless signal and when the transponder device transmits the second wireless signal; and by calculating the corrected transactional difference range value by subtracting a time-of-flight between the originator device and the transponder device from the transactional difference range.

According to still a further aspect of this disclosure, the corrected transactional difference range value is used to estimate the position of the observer device.

According to an aspect of this disclosure, an observer device includes a radio device configured to receive a first wireless signal from an originator device and to receive a second wireless signal from a transponder device, and a processor configured to calculate a transactional difference range at the observer device based on the first wireless signal received at the observer device and the second wireless signal received at the observer device. The radio device may be configured to receive a data transmission from the originator device, wherein the data transmission includes information related to a round-trip time-of-flight measurement between the originator device and the transponder device. The processor may be configured to calculate a corrected transactional difference range value at the observer device using the transactional difference range and at least part of the information related to the round-trip time-of-flight measurement between the originator device and the transponder device. The first wireless signal may include a measurement request packet including a destination address corresponding to an identifier for the transponder device, and the second wireless signal may include a measurement reply packet including a destination address corresponding to an identifier for the originator device. The processor may be configured to calculate the transactional difference range at the observer device by calculating a time difference of arrival at the observer device based on when the first wireless signal is received at the observer device and when the second wireless signal is received at the observer device.

According to another aspect of this disclosure, the processor may be configured to calculate the transactional difference range at the observer device by measuring an observer time difference, corresponding to the time period between receiving the first wireless signal at the observer device and receiving the second wireless signal at the observer device, measuring a first phase value, corresponding to the phase of the first wireless signal received at the observer device, and measuring a second phase value, corresponding to the phase of the second wireless signal received at the observer device. The processor may be further configured to calculate a corrected transactional difference range value at the observer device by calculating the transactional difference range by adding the observer time difference and the first phase value, subtracting the second phase value, and subtracting a turn-around time for the transponder device to determine the transactional difference range, wherein the turn-around time corresponds to the difference in time between when the transponder device receives the first wireless signal and when the transponder device transmits the second wireless signal. The processor may calculate the corrected transactional difference range value by subtracting a time-of-flight between the originator device to the transponder device from the transactional difference range.

According to still another aspect of this disclosure, a system includes an originator device configured to transmit a first wireless signal to a first transponder device and to transmit a second wireless signal to a second transponder device, the first transponder device is configured to transmit a third wireless signal to the originator device, the second transponder device is configured to transmit a fourth wireless signal to the originator device. The system includes at least one observer device including an observer radio configured to receive the first and second wireless signals from the originator device, to receive the third wireless signal from the first transponder device, and to receive the fourth wireless signal from the second transponder device, and a first processor configured to calculate a first transactional difference range at the observer device based on the first wireless signal and the third wireless signal, and to calculate a second transactional difference range at the observer device based on the second wireless signal and the fourth wireless signal. The originator device may include a second processor configured to calculate a first round-trip time-of-flight measurement between the originator device and the first transponder device using the first wireless signal and the third wireless signal, and to calculate a second round-trip time-of-flight measurement between the originator device and the second transponder device using the second wireless signal and the fourth wireless signal. The first wireless signal may include a first measurement request packet including a destination address corresponding to an identifier for the first transponder device, the third wireless signal may include a first measurement reply packet including a destination address corresponding to an identifier for the originator device, the second wireless signal may include a second measurement request packet including a destination address corresponding to an identifier for the second transponder device, and the fourth wireless signal may include a second measurement reply packet including a destination address corresponding to the identifier for the originator device.

According to still another aspect of this disclosure, the first processor may be configured to calculate the first transactional difference range at the observer device by calculating a first time difference of arrival at the observer device based on when the first wireless signal is received at the observer device and when the third wireless signal is received at the observer device, and to calculate the second transactional difference range at the observer device by calculating a second time difference of arrival at the observer device based on when the second wireless signal is received at the observer device and when the fourth wireless signal is received at the observer device. The first processor may be configured to calculate the first transactional difference range at the observer device by measuring a first observer time difference, corresponding to the time period between receiving the first wireless signal at the observer device and receiving the third wireless signal at the observer device, measuring a first phase value, corresponding to the phase of the first wireless signal received at the observer device, and measuring a second phase value, corresponding to the phase of the third wireless signal received at the observer device. The first processor may be further configured to calculate a first corrected transactional difference range value at the observer device by calculating the first transactional difference range by adding the first observer time difference and the first phase value, subtracting the second phase value, subtracting a first turn-around time for the first transponder device to determine the first transactional difference range, wherein the first turn-around time corresponds to the difference in time between when the first transponder device receives the first wireless signal and when the first transponder device transmits the third wireless signal. The processor may be further configured to calculate the first corrected transactional difference range value by subtracting a time-of-flight between the originator device and the transponder device from the first transactional difference range.

According to still another aspect, a method includes transmitting a first wireless signal from an originator device to a transponder device, transmitting a second wireless signal from the transponder device to the originator device, receiving the first wireless signal transmitted from the originator device at at least one observer device, receiving the second wireless signal transmitted from the transponder device at the at least one observer device, and calculating a transactional difference range at the at least one observer device based on the first wireless signal received at the observer device and the second wireless signal received at the observer device. The method may include calculating a round-trip time-of-flight measurement between the originator device and the transponder device using the first wireless signal and the second wireless signal. The first wireless signal may include a measurement request packet, and the second wireless signal may include a measurement reply packet. The measurement request packet may include a destination address corresponding to an identifier for the transponder device, and the measurement reply packet may include a destination address corresponding to an identifier for the originator device.

According to a further aspect of this disclosure, calculating the first transactional difference range at the observer device may include calculating a time difference of arrival at the observer device based on when the first wireless signal is received at the observer device and when the second wireless signal is received at the observer device. Calculating the first transactional difference range at the observer device may include measuring an observer time difference, corresponding to the time period between receiving the first wireless signal at the observer device and receiving the second wireless signal at the observer device, measuring a first phase value, corresponding to the phase of the first wireless signal received at the observer device, and measuring a second phase value, corresponding to the phase of the second wireless signal received at the observer device. The method may also include calculating a first corrected transactional difference range value at the observer by calculating the first transactional difference range by adding the observer time difference and the first phase value, subtracting the second phase value, subtracting a turn-around time for the transponder device to determine the first transactional difference range, wherein the turn-around time corresponds to the difference in time between when the transponder device receives the first wireless signal and when the transponder device transmits the second wireless signal. Calculating the first corrected transactional difference range value may include subtracting a time-of-flight between the originator device and the transponder device from the first transactional difference range.

According to still another aspect of this disclosure, a system includes a coordinator configured to instruct a first transceiver device in a plurality of transceiver devices to initiate a first round-trip time-of-flight measurement with a second transceiver device in the plurality of transceiver devices, the first transceiver device may include a first transceiver radio configured to transmit a first wireless signal to the second transceiver device as part of the first round-trip time-of-flight measurement, the second transceiver device may include a second transceiver radio configured to transmit a second wireless signal to the first transceiver device as part of the first round-trip time-of-flight measurement. The system also includes at least one observer device including an observer radio configured to receive the first wireless from the first transceiver device and to receive the second wireless signal from the second transceiver device, and an observer processor configured to calculate a transactional difference range at the at least one observer device based on the first wireless signal and the second wireless signal. The first transceiver device may include a transceiver processor may be configured to calculate a value related to the first round-trip time-of-flight measurement. The first transceiver device may transmit the value corresponding to the first round-trip time of flight measurement to at least one of the coordinator and the at least one observer device.

According to still another aspect, the observer processor may be configured to calculate the first transactional difference range by calculating a time difference of arrival at the observer device based on when the first wireless signal is received at the observer device and when the second wireless signal is received at the observer device. The observer processor may be configured to calculate the transactional difference range at the observer device by measuring an observer time difference, corresponding to the time period between receiving the first wireless signal at the observer device and receiving the second wireless signal at the observer device, measuring a first phase value, corresponding to the phase of the first wireless signal received at the observer device, and measuring a second phase value, corresponding to the phase of the second wireless signal received at the observer device. The observer processor may be configured to calculate a corrected transactional difference range value by calculating the transactional difference range by adding the observer time difference and the first phase value, subtracting the second phase value, and subtracting a turn-around time for the second transceiver device to determine the transactional difference range, wherein the turn-around time corresponds to the difference in time between when the second transceiver device receives the first wireless signal and when the second transceiver device transmits the second wireless signal. The observer processor may be configured to calculate the corrected transactional difference range value by subtracting a time-of-flight between the first transceiver device and the second transceiver device from the transactional difference range. The observer processor may be further configured to estimate the position of the at least one observer device based on the corrected transactional difference range value and at least one of inertial measurement data, digital magnetic compass data, global positioning data, or round-trip time-of-flight data, wherein the round-trip time-of-flight data corresponds to a round-trip time-of-flight measurement between the observer device and at least one transceiver device.

According to still another aspect of this disclosure, a system includes a plurality of transceiver devices, wherein each transceiver device in the plurality of transceiver devices is configured to perform a round-trip time-of-flight measurement with at least one other transceiver device in the plurality of transceiver devices, and calculate a transactional difference range when the transceiver device is not performing a round-trip time-of-flight measurement with at least one other transceiver device. The first transceiver device may perform a round-trip time-of-flight measurement with a second transceiver device. A third transceiver device may calculate a transactional difference range based on the round-trip time-of-flight measurement between the first transceiver device and the second transceiver device. The first transceiver device may calculate a value related to the distance between the first transceiver device and the second transceiver device. The third transceiver device may calculate a corrected transactional difference range value using the transactional difference range and the value related to the distance between the first transceiver device and the second transceiver device.

According to still another aspect, the system may include a processor configured to estimate or update a position of the third transceiver device based on the corrected transactional difference range value. The processor may be configured to estimate or update a position of the third transceiver device based on the transactional difference range and the value related to the distance between the first transceiver device and the second transceiver device.

According to still a further aspect, the system may include a first pair of transceiver devices in the plurality of transceiver devices performing a first round-trip time-of-flight measurement, a second pair of transceiver devices in the plurality of transceiver devices performing a second round-trip time-of-flight measurement, and a first observing transceiver device calculates a first transactional difference range based on the first round-trip time-of-flight measurement and calculates a second transactional difference range based on the second round-trip time-of-flight measurement. The first observing transceiver device may be configured to calculate a first corrected transactional difference range value based on the first transactional difference range and a first value related to the distance between the first pair of transceiver devices, and calculate a second corrected transactional difference range value based on the second transactional difference range and a second value related to the distance between the second pair of transceiver devices.

According to still a further aspect of this disclosure, the system may include a processor configured to estimate or update a position of the first observing transceiver device based on at least one of the first corrected transactional difference range value and the second corrected transactional difference range value. The processor may be configured to estimate or update a position of the first observing device based on the first transactional difference range and a value related to the distance between the first pair of transceiver devices, and the second transactional difference range and a value related to the distance between the second pair of transceiver devices.

According to yet another aspect of this disclosure, the first round-trip time-of-flight measurement and the second round-trip time-of-flight measurement are scheduled by a coordinator.

According to still a further aspect of this disclosure the system may include a first transceiver device in the plurality of transceiver devices configured to listen for a first transmission comprising a measurement request packet from a second transceiver device, determine whether the measurement request packet contains a destination address corresponding to the first transceiver device, and transmit a measurement reply packet, if the measurement request packet contains a destination address corresponding to the first transceiver device. The measurement request packet and the measurement reply packet may be used to calculate a round-trip time-of-flight between the first transceiver device and the second transceiver device. The first transceiver device may be configured to wait for a measurement reply packet from a third transceiver device, if the measurement request packet does not contain a destination address corresponding to the first transceiver device, and to calculate a transactional difference range based on the measurement request packet from the second transceiver device and the measurement reply packet from the third transceiver device. The system may further include a processor configured to estimate or update a position of the first transceiver device using the transactional difference range and a value related to the distance between the second transceiver device and the third transceiver device. The system may further include a coordinator configured to schedule a plurality of round-trip time-of-flight measurements between a plurality of transceiver pairs in the plurality of transceiver devices. The plurality of round-trip time-of-flight measurements may be determined by a list identifying the plurality of transceiver pairs. The plurality of round-trip time-of-flight measurements may be scheduled by a plurality of data message packets identifying each of the plurality of transceiving pairs.

According to still a further aspect of this disclosure, a first transceiver device in the plurality of transceiver devices may be configured to determine whether a round-trip time-of-flight measurement has been initiated by another transceiver device, transmit a measurement request packet to a second transceiver device in the plurality of transceiver devices, if a round-trip time-of-flight measurement has not been initiated, receive a measurement reply packet from the second transceiver device, and determine a value related to the distance between the first transceiver device and the second transceiver device based on the measurement request packet and the measurement reply packet. The system may include a third transceiver device in the plurality of transceiver devices configured to use the measurement request packet and the measurement reply packet to calculate a transactional difference range at the third transceiver device. The system may also include a processor configured to estimate or update a position of the third transceiver device using the transactional difference range at the third transceiver device and the value related to the distance between the first transceiver device and the second transceiver device. The value related to the distance between the first transceiver device and the second transceiver device may correspond to the distance between the first transceiver device and the second transceiver device. The value related to the distance between the first transceiver device and the second transceiver device may correspond to the time-of-flight of the at least one of the measurement request packet and the measurement reply packet.

According to yet a further aspect of this disclosure, a method of locating an observer includes performing a round-trip time-of-flight measurement between an originator and a transponder, calculating a transactional difference range at the observer based on the round-trip time-of-flight measurement, and estimating a position of the observer based on the transactional difference range and a value related to the distance between the observer and the transponder. Estimating a position of the observer may include calculating a corrected transactional difference range value by subtracting the value related to the distance between the observer and the transponder from the transactional difference range. Estimating the position of the observer further may include inputting the corrected transactional difference range value into a recursive filter and estimating the position of the observer using the recursive filter. Estimating the position of the observer further may include inputting the corrected transactional difference range value into a recursive filter; inputting a transactional difference range error value into the recursive filter; and estimating the position of the observer using the recursive filter based on at least the corrected transactional difference range value and the transactional difference range error value. Estimating the position of the observer using the recursive filter may include estimating the position of the observer based on the inputted corrected transactional difference range value and inputted additional position information, wherein the additional position information includes a value based on at least one of inertial navigation data, digital magnetic compass data, global navigation satellite system data, global positioning coordinates, and range measurement data. The recursive filter may be a Kalman filter.

According to still another aspect of this disclosure, the method may include calculating a plurality of transactional difference ranges at the observer, based on a plurality of round-trip time-of-flight measurements, calculating a plurality of corrected transactional differences range values based on the plurality of transactional difference ranges and a plurality of distance-related values corresponding to the plurality of round-trip time-of-flight measurements, and estimating the position of the observer using the plurality of corrected transactional differences range values.

It is to be understood that both the foregoing general description and the following detailed description are exemplary and explanatory only and are not restrictive of the scope of the invention as claimed.

DESCRIPTION OF THE EXEMPLARY EMBODIMENTS

Figure 1:
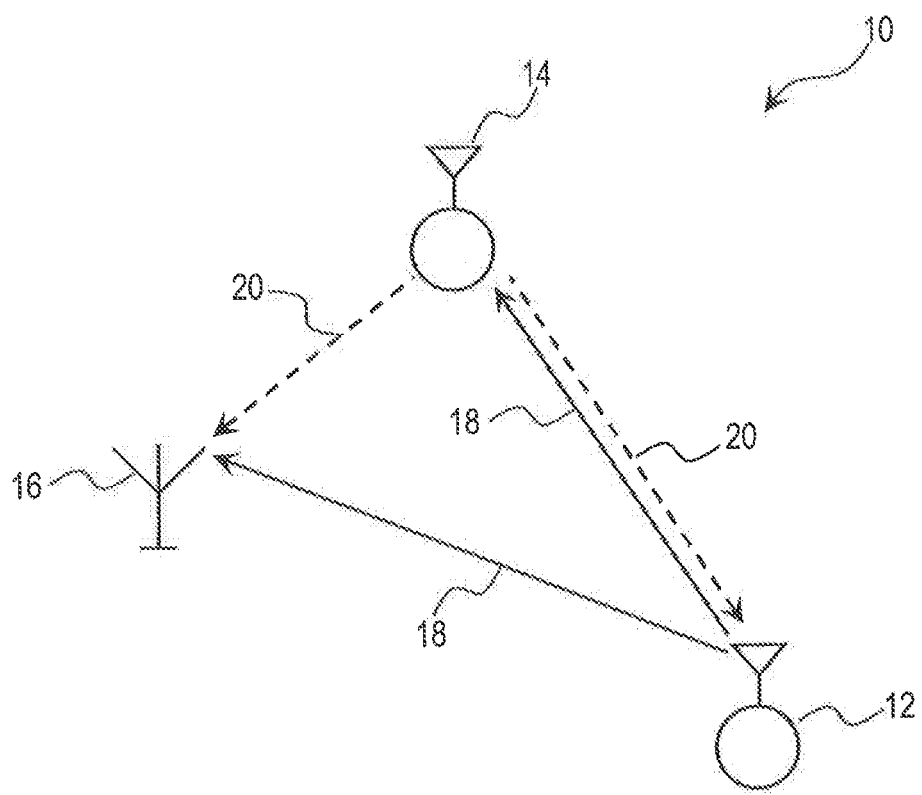
FIG. 1 is a diagram of an exemplary geolocation system.

FIG. 1 is a diagram of an exemplary geolocation system 10. System 10 includes an originator 12, transponder 14, and an observer 16. Originator 12 and transponder 14 include radios having transmitting and receiving capabilities. Observer 16 includes a radio that may have both transmitting and receiving capabilities, or may have only receiving capabilities. It is contemplated that originator 12, transponder 14, and observer 16 may represent the same or similar components, which may function as any one or more of an originator, a transponder, or an observer, depending on the system capabilities. Although system 10 of FIG. 1 depicts only three devices (originator 12, transponder 14, and observer 16), it is contemplated that a system 10 may include more than one originator 12, more than one transponder 14, and more than one observer 16. Exemplary systems having more than one originator, transponder, or observer device are discussed in greater detail below.

As used herein, the terms "originator," "originator radio," and "originator device" refer generally to a device that originates a RTTOF measurement signal. The terms "transponder," "transponder radio," and "transponder device" generally refer to a device that receives the signal sent from the originator and serves as the intermediate device in a RTTOF measurement. The terms "observer," "observer radio," and "observer device" generally refer to a device that receives the originating RTTOF measurement signal from the originator and a reply RTTOF measurement signal from a transponder, but neither initiates nor acts as an intermediate device in the RTTOF measurement. It is contemplated that "radios" referred to in this disclosure may be attached to other objects, such as buildings, vehicles, animals, people, towers, etc. For simplicity, the objects to which the radios are attached are neither shown in the figures nor necessarily directly referenced in this disclosure. An omission of the object to which the radio is attached is not intended to suggest that the radios exist in isolation from other objects. To the contrary, the radios and devices discussed in this disclosure will often be attached to other objects, and it is understood that the systems and examples below include additional objects to which the radios may be attached. Similarly, when a radio, object, or device is referred to as processing or performing calculations on a signal, transmission, or data, it is contemplated that processing may occur in a device or object to which the radio is attached or may occur in an external computer or processor. It is also contemplated that the object may include a processing device that processes the measurements directly.

Referring to exemplary system 10 of FIG. 1, originator 12 transmits a wireless signal 18, which is received by transponder 14 and observer 16. Transponder 14 and observer 16 may process the incoming wireless signal 18, as described in greater detail below. It is contemplated that wireless signal 18 is a transmission from originator 12 that is received by both transponder 14 and observer 16, but which may be specifically identify transponder 14 as the intended transponding device. Transponder 14 then transmits a second wireless signal 20, which is received by originator 12 and observer 16. It is contemplated that wireless signal 20 is a transmission from transponder 14 that is received by both originator 12 and observer 16. Originator 12 may then calculate the distance between originator 12 and transponder 14 based on the RTTOF, as described below. Observer 16 may use the received wireless signals 18 and 20 to determine the position of observer 16 relative to originator 12 and transponder 14. According to some embodiments, originator 12 may then send information related to the distance between originator 12 and transponder 14 to observer 16. The distance-related information may include, for example, the distance between originator 12 and transponder 14, the locations of between originator 12 and transponder 14, the RTTOF between originator 12 and transponder 14, or the one-way time-of-flight between originator 12 and transponder 14. Observer 16 may use the transmitted distance-related information when determining the position of observer 16 in relation to originator 12 and transponder 14. Exemplary signal processing in each of transponder 14, originator 12, and observer 16 are described below.

Range Measurements

Figure 2:
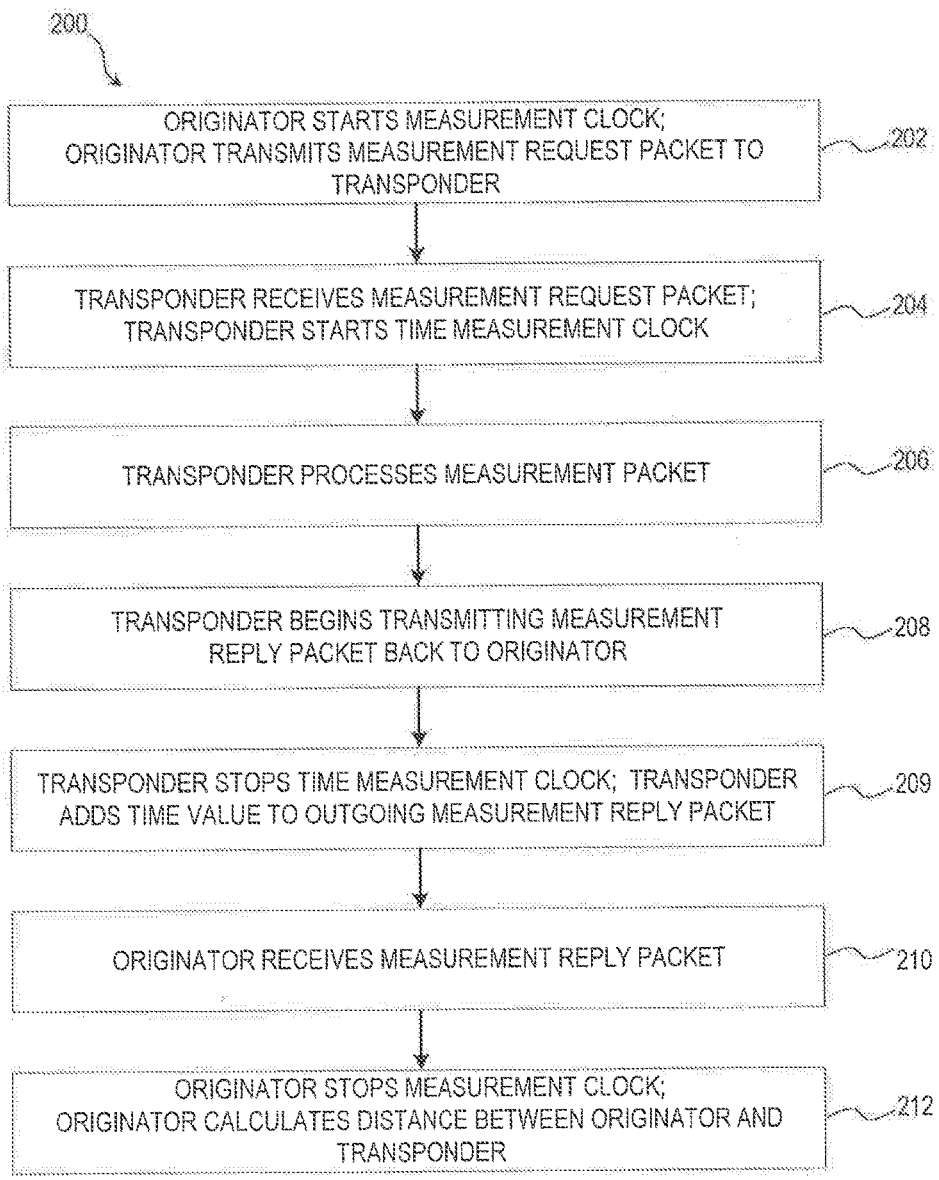
FIG. 2 is an exemplary method for performing a range measurement.

FIG. 2 shows an exemplary method 200 for performing a range measurement between exemplary originator 12 and exemplary transponder 14 of FIG. 1. At step 202, originator 12 starts a measurement clock and transmits a measurement request packet as part of wireless signal 18 to transponder 14. According to some embodiments, the measurement request packet may include a preamble, a synchronization word, and a data payload. Originator 12 may start the measurement clock upon transmission of the synchronization word.

At step 204, transponder 14 receives wireless signal 18. Transponder 14 may start an internal time measurement clock upon receipt of the measurement request packet in order to determine or record the amount of time taken for transponder 14 to process the measurement request packet. For example, transponder 14 may start the time measurement clock upon receipt of the synchronization word in the message request packet. Transponder 14 may also measure a phase value for the received wireless signal 18, for example, at the synchronization word. At step 206, transponder 14 processes the measurement request packet and begins preparing a measurement reply packet. According to some embodiments, as part of processing the measurement request packet, transponder 14 may calculate a peak error value for wireless signal 18, for example, using the measured phase. Preparing the measurement reply packet may include, for example, adding a destination address corresponding to an identifier (ID) of originator 12.

At step 208, transponder 14 begins transmitting the measurement reply packet to originator 12 as part of wireless signal 20. At step 209, transponder 14 stops the time measurement clock and adds the corresponding time value to the outgoing message reply packet. For example, transponder 14 may stop the time measurement clock upon transmission of the synchronization word in the measurement reply packet. According to these embodiments the time measurement clock corresponds to the time between receipt of the synchronization word as part of the measurement request packet and transmission of the synchronization word as part of the measurement reply packet. This time value represents a "turn-around time" for transponder 14. Also at step 209, transponder 14 may add the turn-around time to the outgoing measurement packet. For example, transponder 14 may insert a value for the actual time elapsed during processing, or a clock cycle count that represents the number of clock cycles between when transponder 14 began the time measurement in step 204 and stopped the time measurement in step 209, or an indication of the first and last clock cycle values from which the total number of clock cycles can be ascertained. According to some embodiments, transponder 14 may not begin a time measurement clock at step 204 and stop the clock at step 209, but may instead determine the corresponding turn-around time from a continuously-running clock, such as by time-stamps or clock cycle values. Transponder 14 may use the measured phase value to provide a more accurate turn-around time, such as using the measured phase to determine sub-clock cycle precision for the turn-around time. According to some embodiments, transponder 14 also adds the measured phase to the measurement reply packet. According to the exemplary method of FIG. 2, when transponder 14 begins transmitting the measurement reply packet, the time measurement clock is still running. The time measurement clock is then stopped at transmission of the synchronization word and the value is added to the outgoing transmission, which allows for a more accurate determination of the turn-around time.

At step 210, originator 12 receives wireless signal 20 and the measurement reply packet from transponder 14. At step 212, originator 12 stops the measurement clock, for example, upon receipt of the synchronization word of the measurement reply packet, and uses the measurement reply packet to calculate the RTTOF and the distance between originator 12 and transponder 14. Originator 12 may also measure a phase of wireless signal 20, such as at the synchronization word, and use this phase value to determine a sub-clock cycle time value. Originator 12 may also calculate the RTTOF between originator 12 and transponder 14 by subtracting the turn-around time recorded by transponder 14 from the total elapsed time between steps 202 and 212 indicated by the originator's 12 measurement clock. Originator 12 may calculate the distance from this RTTOF, for example, by multiplying by the speed of light and dividing by two.

According to some embodiments, originator 12 may not begin a measurement clock at step 202 and stop the clock at step 212, but may instead determine the corresponding elapsed time from a continuously-running clock, such as by time-stamps or clock cycle values. Originator 12 may use the elapsed time to calculate the RTTOF or distance, as described above.

Figure 3:
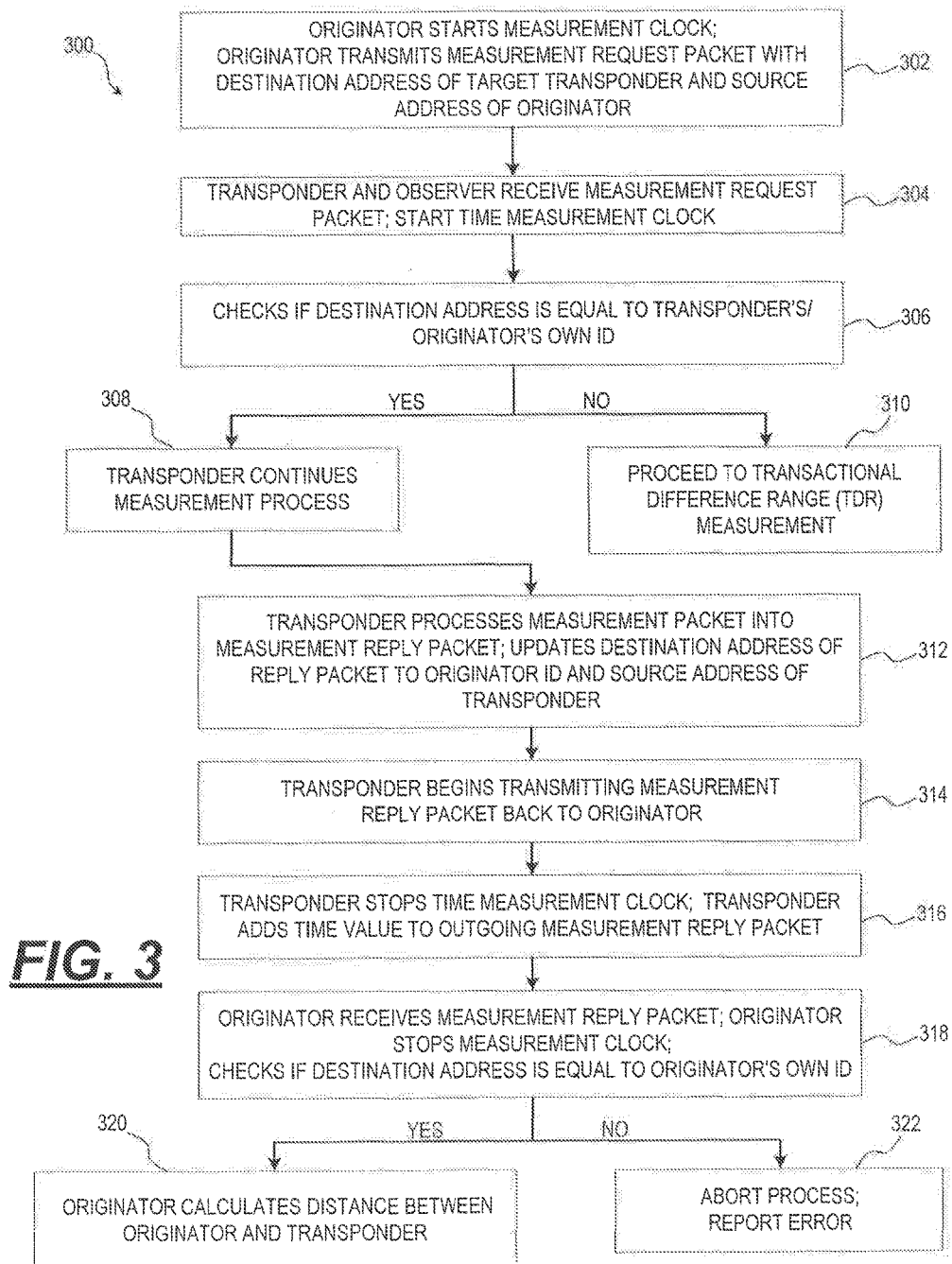
FIG. 3 is another exemplary method for performing a range measurement.

FIG. 3 shows another exemplary method 300 for performing a range measurement between exemplary originator 12 and exemplary transponder 14 of FIG. 1. At step 302, originator 12 starts a measurement clock and transmits a measurement request packet as part of wireless signal 18 to transponder 14 and observer 16. For example, originator 12 may start the measurement clock upon transmission of a synchronization word in the measurement request packet. The measurement request packet transmitted at step 302 contains a source address and a destination address. The source address corresponds to the ID for originator 12, which transmits the measurement request packet. The destination address corresponds to the ID for transponder 14, which receives the measurement request packet and transmits a measurement reply packet. Observer 16 may be a passive observer and originator 12 may not be aware of the presence of observer 16, according to some embodiments.

At step 302, originator 12 initiates a range measurement between itself and transponder 14. However, because transponder 14 and observer 16 may be the same (or similar) types of devices, each recipient of wireless signal 18 determines whether it should provide a measurement reply packet. At step 304, transponder 14 and observer 16 receive wireless signal 18. According to some embodiments, each of transponder 14 and observer 16 may start an internal clock upon receipt of the measurement request packet from originator 12. As described above, with reference to FIG. 2, transponder 14 begins a time measurement clock in order to determine or record the turn-around time for transponder 14. For example, transponder 14 may start the time measurement clock upon receipt of the synchronization word. Observer 16 begins a clock to determine the value of a transactional difference range (TDR) measurement, as described below. Observer 16 may also the clock upon receipt of the synchronization word. According to some embodiments, transponder 14 and observer 16 may measure a phase value for wireless signal 18, and use a phase value to determine a sub-clock cycle measurement time. The phase value may correspond to the synchronization word.

At step 306, each of transponder 14 and observer 16 determine whether the destination address of the measurement request packet is the same as transponder 14 or observer's 16 own ID, respectively. If the destination address matches transponder's 14 own ID, then the method proceeds to step 308, where transponder 14 processes the measurement request packet into a measurement reply packet. If the destination address does not match the ID for the device (e.g., observer 16), then the method proceeds to step 310, where a TDR measurement is performed. The process for performing a TDR measurement will be described in greater detail below. In FIG. 3, it is contemplated that transponder 14 and observer 16 perform the same check at step 306. To facilitate clarity in describing the exemplary method, the designations of transponder and observer have been used in FIG. 3. However, it is understood that whether a device actually performs the function of a transponder or observer may depend on the result of step 306, and whether the device then proceeds to step 308 (e.g., a transponder) or step 310 (e.g., an observer).

From step 308, the method proceeds to step 312 for processing of the measurement request packet and preparation of a measurement reply packet by transponder 14. At step 312, transponder 14 sets the destination address for the measurement reply packet to the source address from the measurement request packet—which corresponds to the ID for originator 12. Transponder 14 also sets the source address of the measurement reply packet equal to transponder's 14 own ID. According to some embodiments, transponder 14 may calculate a peak error value for wireless signal 18 received from originator 12 and may add this value to the measurement reply packet. According to some embodiments, transponder 14 may use the peak error value to perform subsequent calculations or computations, the results of which may be included as part of the measurement reply packet.

When processing at step 312 is complete, the method proceeds to step 314, where transponder 14 begins transmitting the measurement reply packet back to originator 12 as part of wireless signal 20. At step 316, upon transmission of the synchronization word, transponder 14 stops the time measurement clock that it started in step 304 and adds a value indicative of the turn-around time to the measurement reply packet. For example, transponder 14 may insert a value for the actual time elapsed during processing, or a clock cycle count that represents the number of clock cycles between when transponder 14 began the time measurement in step 304 and stopped the time measurement in step 316, or an indication of the first and last clock cycle values from which the total number of clock cycles can be ascertained. As explained above, according to some embodiments, transponder 14 may not start a clock in step 304 and stop the clock in step 316, but may instead determine the turn-around time based on an already running clock. According to some embodiments, transponder 14 also adds the measured phase value to the measurement reply packet.

At step 318, originator 12 receives wireless signal 20 and the measurement reply packet from transponder 14. Originator 12 also stops the measurement clock that it started at step 302, for example, upon receipt of the synchronization word. Also at step 318, originator 12 determines whether the destination address of the measurement reply packet is the same as originator's 12 own ID. If the destination address matches the ID for originator 12, the method proceeds to step 320, where originator 12 uses the measurement reply packet to calculate the RTTOF between originator 12 and transponder 14. Originator 12 may also measure a phase of wireless signal 20, for example, at the synchronization word, and use this phase value to determine a sub-clock cycle time value as part of the RTTOF calculation. Originator 12 may also calculate the RTTOF between originator 12 and transponder 14 by subtracting the turn-around tome for transponder 14 from the total elapsed time indicated by the originator's 12 measurement clock between step 302 and 318. Originator 12 may calculate the distance from this RTTOF, for example, by multiplying by the speed of light and dividing by two. If, at step 318, the destination address of the measurement reply packet does not match originator's 12 own ID, then the method proceeds to step 322, where originator 12 aborts the measurement and reports and error.

According to some embodiments, originator 12 may not begin a measurement clock at step 302 and stop the clock at step 318, but may instead determine the corresponding elapsed time from a continuously-running clock, such as by time-stamps or clock cycle values. Originator 12 may use the elapsed time to calculate the RTTOF, as described above.

According to some embodiments, originator 12 and transponder 14 may perform a RTTOF as described in U.S. Pat. Nos. 8,199,047 and 8,314,731 (which are assigned to the same assignee as the present disclosure), the disclosures of which are hereby incorporated by reference in their entirety. It is contemplated that the methods disclosed in U.S. Pat. Nos. 8,199,047 and 8,314,731 may be used in conjunction with either of the methods 200 or 300. Other methods of performing a RTTOF measurement are also contemplated.

Transactional Difference Range Measurements

Figure 4:
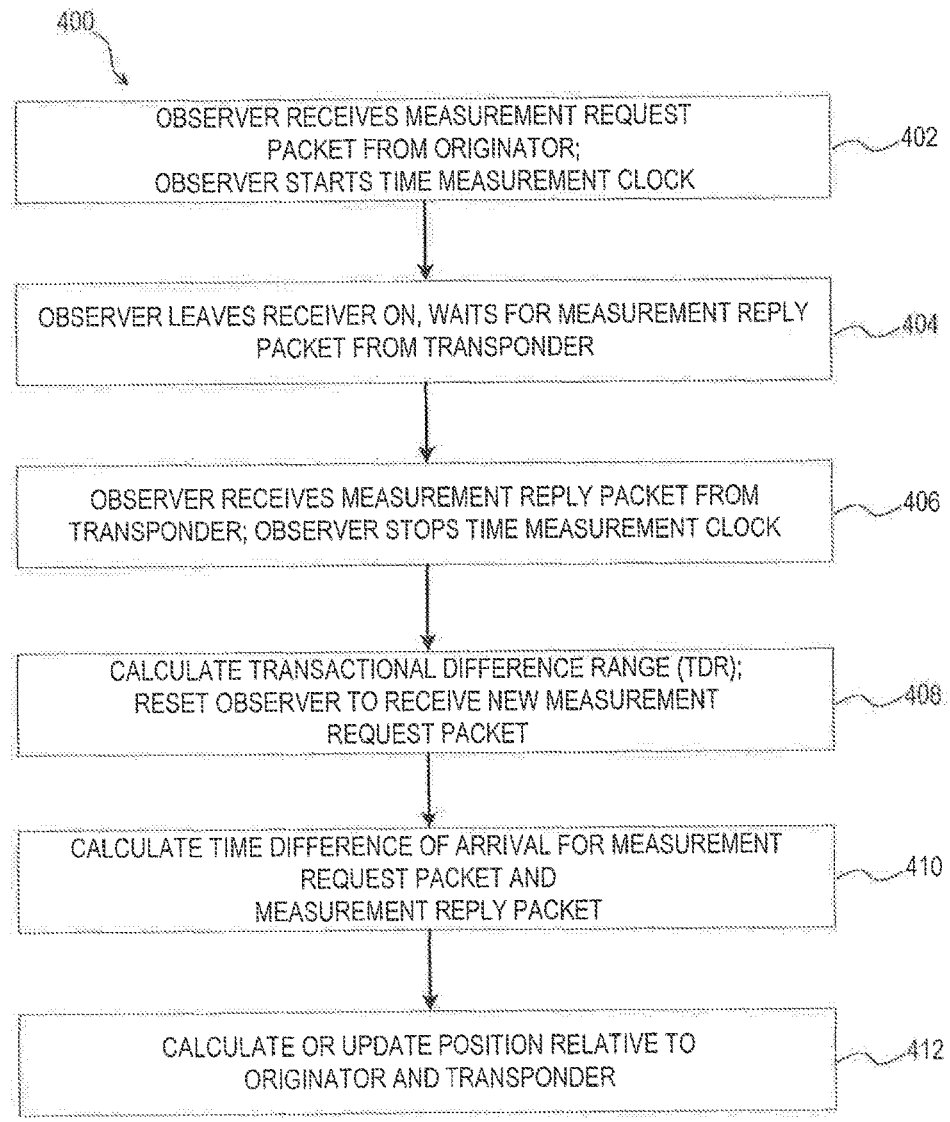
FIG. 4 is an exemplary method for performing a transactional difference range measurement.

FIG. 4 describes an exemplary transactional difference range (TDR) measurement method 400 with reference to exemplary system 10 shown in FIG. 1. At step 402, observer 16 receives the measurement request packet from originator 12 as part of wireless signal 18. Upon receiving the measurement request packet, observer 16 starts a time measurement clock, for example, upon receipt of the synchronization word. Observer 16 may also measure a phase value of the incoming signal, for example, corresponding to the synchronization word. Once the full measurement request packet is received, at step 404, observer 16 leaves the receiver on and waits to receive the measurement reply packet from transponder 14.

It is contemplated that observer 16 may determine whether a destination address in the measurement request packet matches observer's 16 own ID, for example, as described in step 306 of FIG. 3. As explained with reference to FIG. 3, if the destination address does not match the observer's 16 own ID, a TDR measurement may be performed by observer 16. In other words, steps 304 and 402 may be analogous, and step 404 may follow step 310 of FIG. 3.

At step 406, observer 16 receives a measurement reply packet as part of wireless signal 20 from transponder 14. Upon receipt of the measurement reply packet, observer 16 stops the time measurement clock that it started during step 402, for example, upon receipt of the synchronization word. Observer 16 may also measure a phase value of the incoming signal, for example, when the synchronization word is received. Once the measurement reply packet is received, observer 16 calculates a TDR measurement at step 408. At step 408, observer 16 may reset to receive a new measurement request packet. According to some embodiments, observer 16 may also receive RTTOF data from originator 12.

Specifically, observer 16 may calculate the TDR measurement by subtracting the turn-around time of transponder 14 (received as part of the measurement reply packet) from the elapsed time between receipt of the measurement request packet and receipt of the measurement reply packet, as described in greater detail below. According to some embodiments, observer 16 may also record and store the TDR measurement result and/or information related to the TDR measurement, such as the originator ID, transponder ID, and transponder measurement data (such as the turn-around time) which may be included in the measurement request packet and/or measurement reply packet.

At step 410, observer 16 may calculate a TDOA result using the TDR measurement and store the TDOA result. For example, observer 16 may calculate the TDOA by subtracting the time-of-flight between originator 12 and transponder 14 from the TDR measurement, as described below.

At step 412, observer 16 may calculate or update its position relative to originator 12 and transponder 16 using one or both of the TDR or TDOA results. It is contemplated that the observer 16 may transmit the TDR or TDOA results to another device, such as an external computer or processor, which calculates or updates the position of observer 16.

To calculate the position of observer 16 relative to originator 12 and transponder 14, observer 16 may calculate the TDR value, $\Delta t_{TDR}$, which represents the difference between the time of arrival of the measurement request packet at observer 16, $t_{meas\_req}$, and the measurement reply packet at observer 16, $t_{meas\_reply}$, minus the turn-around time of transponder 14, $\Delta t_{trans}$. Mathematically, $$\Delta t_{TDR} = (t_{meas\_reply} - t_{meas\_req}) - \Delta t_{trans}$$

According to some embodiments, $t_{meas\_reply} - t_{meas\_req}$ may be represented by the time measurement clock between steps 402 and 406, $M_{observer}$, described above, and correcting the time measurement using the incoming phases (represented as a fractional clock cycle) of the wireless signals 18 and 20 transmitting the measurement request packet, $\varphi_{orig/obs}$, and the measurement reply packet, $\varphi_{trans/obs}$, respectively, as shown below. In other words $$t_{meas\_reply} - t_{meas\_req} = M_{observer} + \varphi_{orig/obs} - \varphi_{trans/obs}$$

$M_{observer}$ may represent a clock count as an integer value of clock cycles. Incorporating the phase values, $\varphi_{orig/obs}$ and $\varphi_{trans/obs}$, increases the measurement accuracy of $\Delta t_{TDR}$ by allowing sub-sample precision between the clock samples. For example, each incoming phase value can be converted to a representation of a fractional clock cycle value, thereby allowing sub-sample precision. For example, for a 44 MHz clock, one clock cycle correspond to about 6.7 meters of accuracy. By incorporating the phase values as fractional clock cycles, the position accuracy can be improved. Substituting for $t_{meas\_reply} - t_{meas\_req}$ into $\Delta t_{TDR}$ yields $$\Delta t_{TDR} = (M_{observer} + \varphi_{orig/obs} - \varphi_{trans/obs}) - t_{trans}$$

According to some embodiments, the turn-around time of transponder 14, $\Delta t_{trans}$, may be represented by $$\Delta t_{trans} = M_{trans} + P_{trans}$$

where $M_{trans}$ represents the measurement clock cycle count (or corresponding time value) for the transponder, for example, the clock cycle count between steps 204 and 209 of method 200 of FIG. 2 or between steps 304 and 316 of method 300 of FIG. 3. $P_{trans}$ represents the peak error of the signal of the signal carrying the measurement request packet and received by transponder 14 (e.g., wireless signal 18 received from originator 12). According to some embodiments, $P_{trans}$ can be calculated as described in U.S. Pat. Nos. 8,199,047 and 8,314,731.

The TDR value, $\Delta t_{TDR}$, can also be represented as $$\Delta t_{TDR} = t_{orig/trans} + t_{trans/obs} - t_{orig/obs}$$

where $t_{orig/trans}$ represents the time-of-flight from originator 12 to transponder 14 (or the RTTOF divided by 2), $t_{trans/obs}$ represents the time-of-flight from transponder 14 to observer 16, $t_{orig/obs}$ represents the time-of-flight from originator 12 to observer 16.

Setting the two equations for $\Delta t_{TDR}$ equal and solving for the TDOA, $t_{trans/obs} - t_{orig/obs}$, yields $$t_{trans/obs} - t_{orig/obs} = ((M_{observer} + \varphi_{orig/obs} - \varphi_{trans/obs}) - \Delta t_{trans}) - t_{orig/trans}$$

or $$t_{trans/obs} - t_{orig/obs} - \Delta t_{TDR} - t_{orig/trans} = \text{TDOA}$$

Observer 16 measures the value for $M_{observer}$ as described above, and measures the values for $\varphi_{orig/obs}$, and $\varphi_{trans/obs}$ when receiving wireless signals 18 and 20, respectively. According to some embodiments, the value for $t_{orig/trans}$ can be received from originator 12 as part of a secondary message, e.g., after originator 12 calculates the RTTOF to transponder 14. According to some embodiments, the value for $t_{orig/trans}$ can be a known quantity, for example, if the distance between originator 12 and transponder 14 is fixed or constant. According to some embodiments, the distance between originator 12 and transponder 14 is fixed or constant when originator 12 and transponder 14 are fixed relative to the earth, for example, they are stationary antennas such as cellular phone towers, corners of a building, or opposite ends of an airport runway. According to some embodiments, the distance between originator 12 and transponder 14 is fixed or constant when originator 12 and transponder 14 are fixed relative to each other, for example, they represent two antennas at different points on a mobile object, such as the bow and stern of an aircraft carrier.

In general terms, $t_{trans/obs} - t_{orig/obs}$ represents the TDOA between the time-of-flight from transponder 14 to observer 16 and the time-of-flight from originator 12 to observer 16. Multiplying this value by the speed of light, c, converts the TDOA at observer 16, $t_{trans/obs} - t_{orig/obs}$, into a distance differential, $d_{trans/obs} - d_{orig/obs}$, where $d_{trans/obs}$ represents the distance between transponder 14 and observer 16, and $d_{orig/obs}$ represents the distance between originator 12 and observer 16. In other words, $$c^*(t_{trans/obs} - t_{orig/obs}) = c^*(M_{observer} + \varphi_{orig/obs} - \varphi_{trans/obs} - \Delta t_{trans} - t_{orig/trans})$$

or $$d_{trans/obs} - d_{orig/obs} = c^*(M_{observer} + \varphi_{orig/obs} - \varphi_{trans/obs} - \Delta t_{trans} - t_{orig/trans})$$

Figure 5:
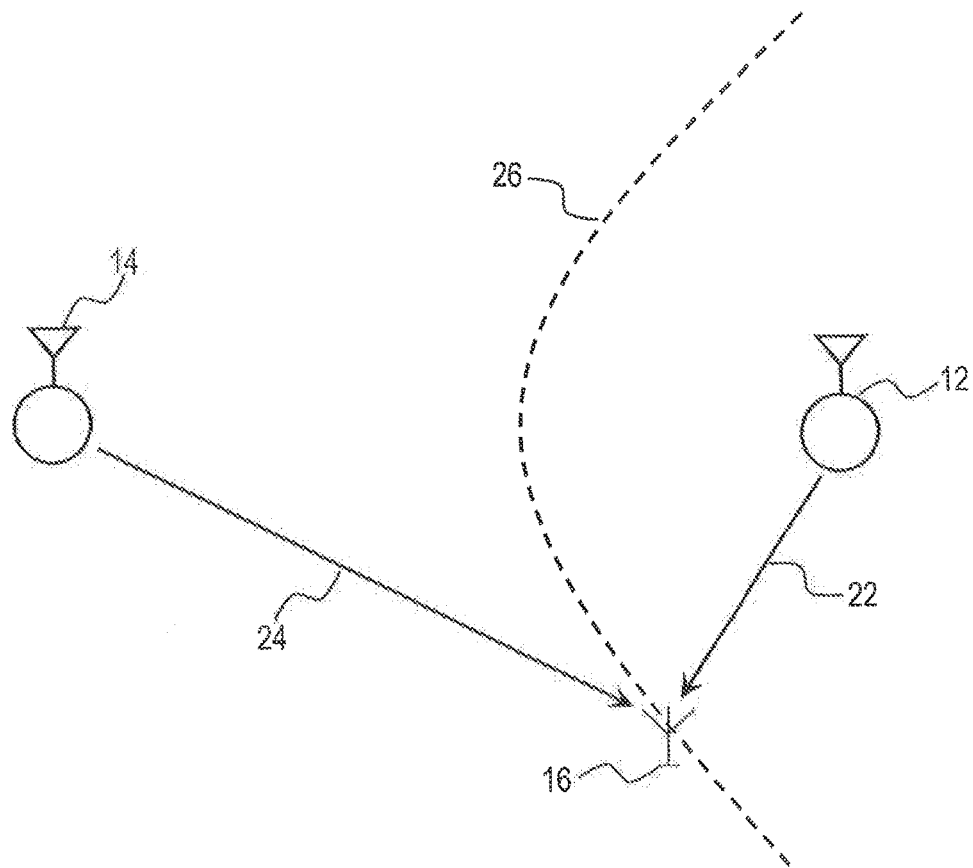
FIG. 5 is a diagram of an exemplary transactional difference range measurement.

The distance difference, $d_{trans/obs}-d_{orig/obs}$, corresponds to the distance value for the calculated TDOA, and places the position of observer 16 on a hyperbola whose foci are located at originator 12 and transponder 14. The hyperbola 26 represents the locus of points equivalent to $d_{trans/obs}-d_{orig/obs}$, as depicted in FIG. 5. In FIG. 5, the distance from originator 12 to observer 16, $d_{orig/obs}$, is denoted by item 22, and the distance from transponder 14 to observer 16, $d_{trans/obs}$, is denoted by item 24. When the TDOA, $t_{trans/obs}-t_{orig/obs}$, and the corresponding distance, $d_{trans/obs}-d_{orig/obs}$, is based a TDR measurement, we refer to this TDOA and/or corresponding distance as "corrected TDR" measurement or a "TDR_c" measurement. TDR_c, as used herein, may refer to either the TDOA time value or the corresponding distance because one can be calculated from the other using the speed of light.

In three-dimensional space, the TDR_c measurement results in a hyperboloid solution, rather than a hyperbola. For simplicity a hyperbola is shown in each of the exemplary system, although it is understood that the present disclosure is applicable to both two-dimensional space and three-dimensional space. For example, error calculation is described below with respect to three-dimensions.

By calculating the TDR_c value, observer 16 can passively determine its relative position to originator 12 and transponder 14 without performing a ranging measurement with either originator 12 or transponder 14. Because a TDR_c measurement is based on a RTTOF measurement between a transceiving pair of radios (e.g., originator 12 and observer 14), it is not required that either the transceiving pair of radios or the observer radio have a synchronized clock to perform the calculations. Because the transponder radio calculates its own turn-around time, based on its own internal clock and transmits turn-around data to the originator and the observer, the transponder and originator devices can be unsynchronized. Similarly, the observer radio can receive time-of-flight information and turn-around time information from the transceiving pair. Because the observer uses its own internal clock to calculate the arrival times for the measurement request packet and the measurement reply packet, the observer radio can be unsynchronized from the observer and transponder radios. Thus, the present disclosure does not require that any of the originator, transponder, or observer devices have synchronized clocks (although it is contemplated that some clocks may be synchronized in some embodiments).

Determining Exact Positions Using TDR_c

Because a single TDR_c measurement places observer 16 on hyperbola 26, as shown in FIG. 5, one TDR_c measurement in isolation is not sufficient to determine the exact position of observer 16. TDR_c measurements can be used to augment other position aids, for example, range measurements between observer 16 and other radio devices, global positioning system (GPS) data, inertial navigation systems, or digital magnetic compasses. Multiple TDR_c measurements may also yield a unique position solution that can be used to determine an observer's specific position. Several examples for determining exact position data are described below; however, it is contemplated that these examples are not limiting of all possible methods for determining an exact position using a TDR_c measurement. Rather, it is contemplated that the principles described below can be applied in other contexts and with other position aids.

The systems, methods, and features described in this disclosure are not intended to be mutually exclusive of one another. Therefore, it contemplates that the various features discussed in this disclosure may be used in conjunction with any of the systems described herein, either in whole or in part. The various systems have been described separately for purposes of illustration and to facilitate understanding, but it is contemplated that some or all of the features described in one exemplary system may be used included with any other system, according to the principles described.

Range Measurements and TDR_c Measurements

Figure 6:
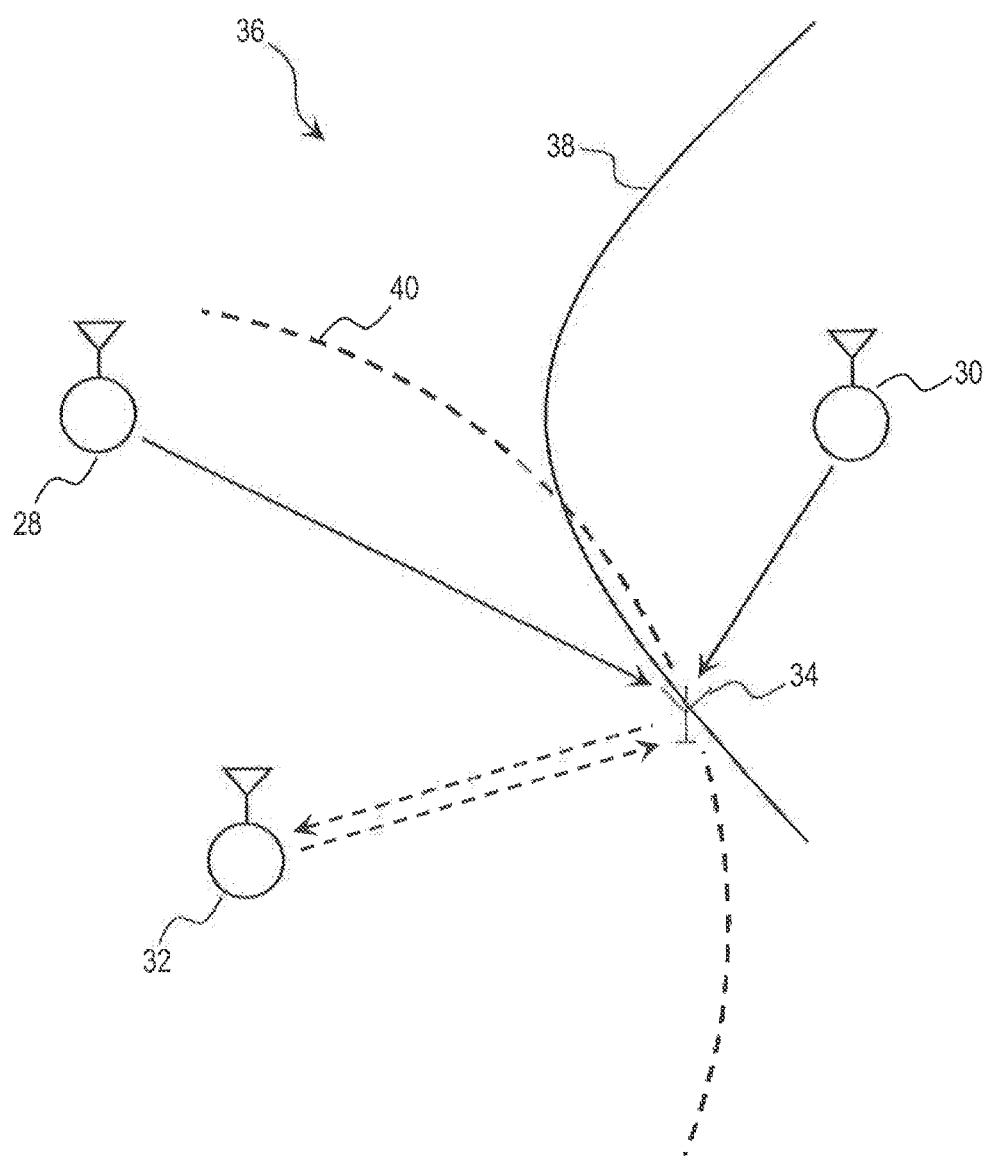
FIG. 6 is a diagram of an exemplary transactional difference range measurement and range measurement.

FIG. 6 depicts an exemplary system 36 for determining the position of an observer radio 34 using three transceiver radios 28, 30, and 32. In FIG. 6, it is contemplated that each of radios 28, 30, 32, and 34 are capable of performing a RTTOF measurement, and at least observer radio 34 is capable of performing a TDR_c measurement. However, it is contemplated that, according to some embodiments, any of radios 28, 30, 32, and 34 may be capable of performing a TDR_c measurement, depending on the needs of the system. It is further contemplated that each of radios 28, 30, 32, and 34 may include the same hardware.

In FIG. 6, a range measurement (not shown) is performed between radios 28 and 30, which act as a transacting pair, as described above with reference to FIGS. 1-3. For purposes of FIG. 6, either of radios 28 and 30 may perform the function of the originator, and the corresponding radio acts as the transponder. Observer 34 performs a TDR_c measurement on the range measurement performed between radios 28 and 30, placing observer 34 on hyperbola 38.

Observer 34 also performs a range measurement with radio 32, for example, as described above with reference to FIGS. 2 and 3. Either of observer 34 or radio 32 may act as the originator, and the corresponding radio acts as the transponder. Once this range measurement is completed, this places observer 34 on the circle 40, whose radius is equal to the distance between radio 32 and observer 34. Thus, the position of observer 34 has been limited to the intersection(s) of hyperbola 38 and circle 40. In FIG. 6, this yields two solutions (although it is understood that in some circumstances, a single solution may be determined when hyperbola 38 and circle 40 intersect at only a single point).

As observer 34 moves in relation to radios 28, 30, and 32, the intersections between hyperbola 38 and circle 40 also move. Using additional position aids, for example, an inertial navigation system, GPS, or a digital magnetic compass, observer 34 can track its current movement vector as well as the position solutions where hyperbola 38 and circle 40 intersect. By tracking these solutions, observer 34 can compare the change in the position solutions with, for example, its inertial navigation equation solutions and/or digital magnetic compass solutions, to determine the true location. For example, if one position solution moves northwest and the second solution moves northeast, and inertial navigation solutions are moving in a northwest direction, then observer 34 knows it is on the northwest-moving intersection of hyperbola 38 and circle 40. Observer 34 may, in turn, calculate a precise location if the coordinates of the radios 28, 30, and 32 are known. It is also contemplated that observer 34 may perform the RTTOF measurement with one of radios 28 or 30 rather than radio 32.

Observing Multiple TDR_c Measurements

Figure 7:
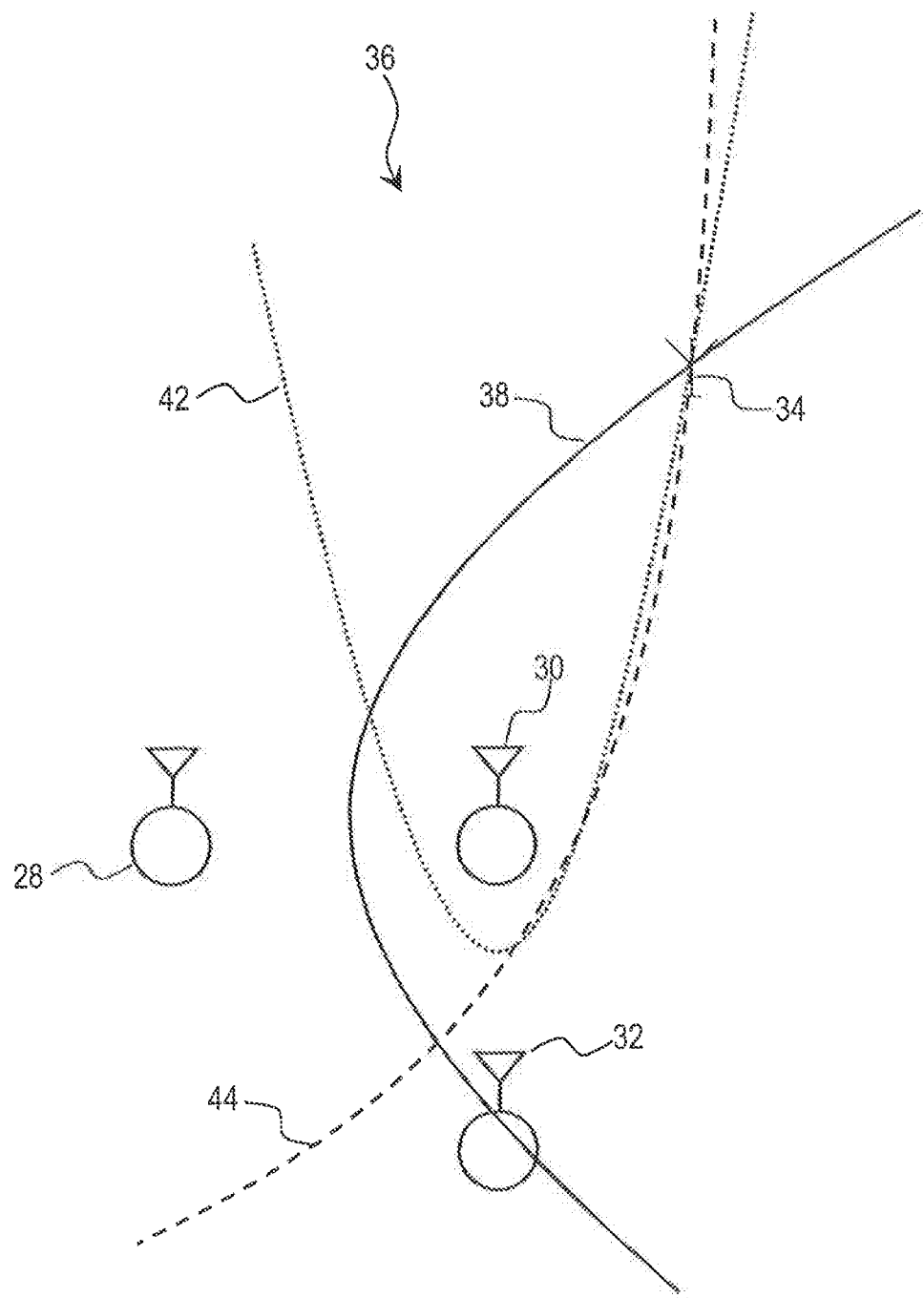
FIG. 7 is a diagram of several transactional difference range measurements.

FIG. 7 depicts exemplary system 36 for determining the position of an observer radio 34 using three transceiver radios 28, 30, and 32. As described above in FIG. 6, according to some embodiments, each of radios 28, 30, 32, and 34 may be able to act as an originator and/or transponder in a RTTOF measurement. It is also contemplated that according to some embodiments, observer 34 may only receive signals from radios 28, 30, and 32 to perform a TDR measurement, which can be used to determine a TDR_c measurement. FIG. 7 depicts three hyperbolas 38, 42, and 44. Hyperbola 38 represents the TDR_c measurement result at observer 34 for a range measurement performed between radios 28 and 30. Similarly, hyperbola 42 represents the TDR_c measurement result at observer 34 for a range measurement performed between radios 30 and 32. Hyperbola 44 represents the TDR_c measurement result at observer 34 for a range measurement performed between radios 28 and 32. The range measurements between radios 28, 30, and 32 are omitted from FIG. 7 for simplicity.

As shown in FIG. 7, only a single position solution exists where all of hyperbolas 38, 42, and 44 intersect. This is the position of observer 34. Because the TDR_c measurement is a relative distance to the locations of radios 28, 30, and 32, the true position (e.g., absolute GPS coordinates) may be solved if the locations of at least some of radios 28, 30, and 32 are known, for example, the GPS coordinates. However, a TDR_c-only solution provides good directional information relating to the opposition of observer 34, even when radio 34 is a long distance away from radios 28, 30, and 34.

Figure 8:
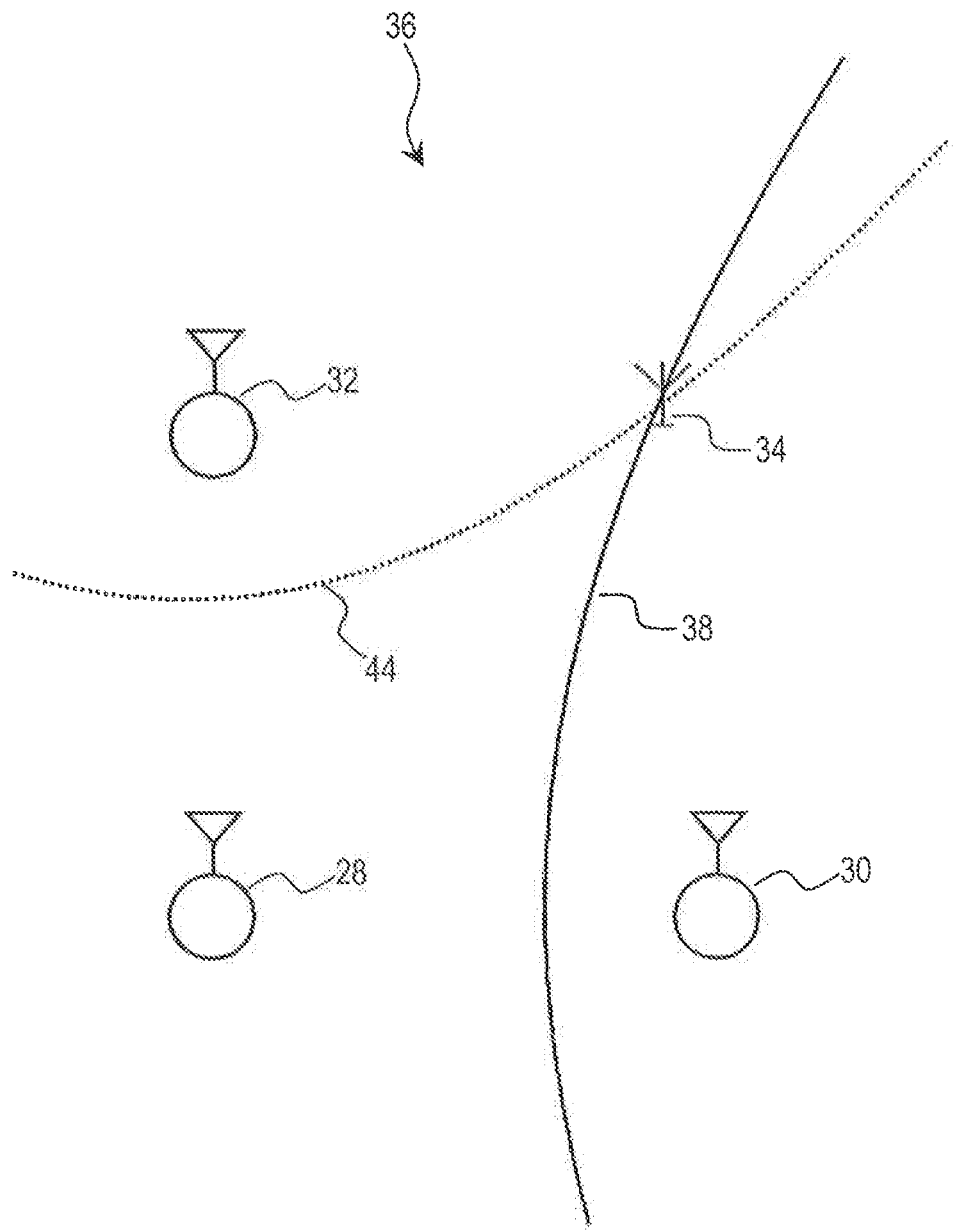
FIG. 8 is a diagram of several transactional difference range measurements.

Although FIG. 7 shows three TDR_c measurements, it is understood that in some situations, only two TDR_c measurements may be needed provide a unique position solution. FIG. 8, for example, depicts system 36 having radios 28, 30, and 32, and observer 34. Two hyperbolas 38 and 44 represent the TDR_c solutions at observer 34 for transacting pair of radios 28 and 30 and for transacting pair of radios 28 and 32, respectively. As shown in FIG. 8, the intersection of hyperbolas 38 and 44 have a single unique solution at observer 34. Thus, although FIG. 7 depicts three TDR_c measurements corresponding to three transacting radios pairs (i.e., radios 28 and 30, radios 30 and 32, and radios 28 and 32), it is contemplated that different numbers of transacting pairs may be used to yield unique position solutions for an observing radio 34.

For N transacting radios, which perform RTTOF measurements as transacting radio pairs, the number of unique inter-radio transacting pairs is equal to $$\frac{N(N-1)}{2} = [\text{Number of Unique Pairs}]$$

Thus, for three transponding radios (e.g., as shown in FIGS. 7 and 8), three "effective transmitters" are obtained. An "effective transmitter" corresponds to a unique inter-radio RTTOF measurement, from which an observing radio (e.g., observer 16 of FIG. 1, or observer 34 of FIGS. 7 and 8) can perform a TDR measurement, and can use the TDR measurement to calculate a TDR_c measurement. For example, for three transponding radios, A, B, and C, there would be three effective transmitters corresponding to the A-to-B round-trip time-of flight measurement, the B-to-C round-trip time-of flight measurement, and the A-to-C round-trip time-of flight measurement. Table 1 below shows the number of effective transmitters for various numbers of transponding radios. The number of effective transmitters corresponds to the maximum number of TDR_c measurements that can be performed using N transacting radios.

TABLE 1

| Number of Effective Transmitters | |
|---|---|
| No. of Transponder Radios | No. of Effective Transmitters |
| 3 | 3 |
| 4 | 6 |

TABLE 1-continued

| Number of Effective Transmitters | |
|---|---|
| No. of Transponder Radios | No. of Effective Transmitters |
| 5 | 10 |
| 6 | 15 |
| 8 | 28 |
| 10 | 45 |

Based on the number of effective pairs in Table 1, TDR_c measurements based on an effective transmitter may be advantageous over pure range measurement-based solutions from each transponder radio to an observing radio. For example, for four transponding radios, an incoming observer could perform four RTTOF measurements, one with each transponder radio, to determine the position of the observer based on the intersection of the four circles created by the four range measurements. However, the maximum number of observable measurements would be four, one for each RTTOF in which the observer participates. But, if the four transponding radios perform RTTOF measurements among themselves, they create six "effective transmitters," which can be observed by an observing radio to perform six TDR_c measurements. The location of the observing radio would be at the intersection of the six hyperbolas resulting from the TDR_c measurements, resulting in a more accurate position estimate for the observing radio.

Scalability

Figure 9:
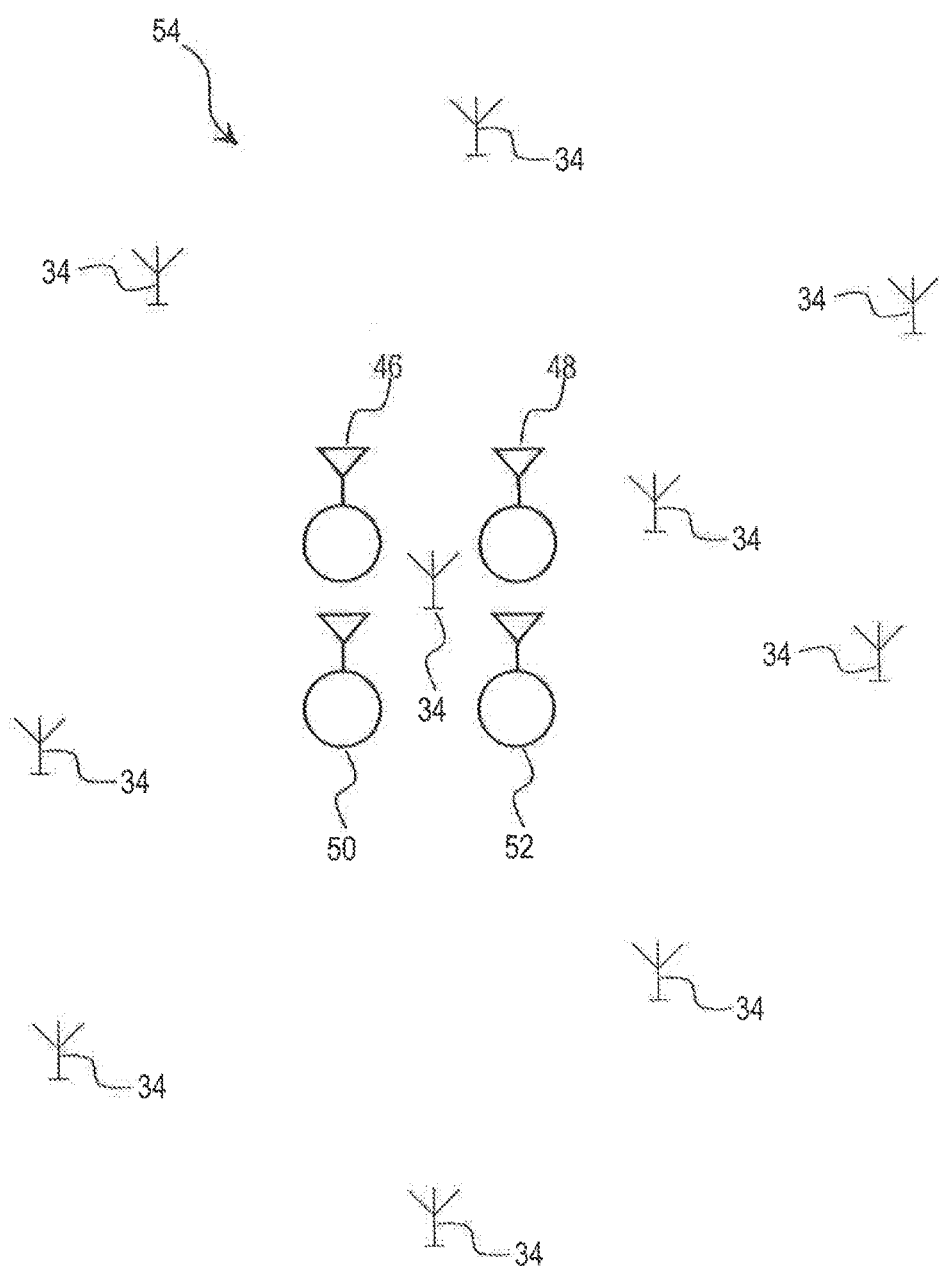
FIG. 9 is a diagram of an exemplary geolocation system having many observer devices.

TDR and TDR_c measurements are infinitely scalable because each observer passively observes each RTTOF measurement between each transponding radio pair (e.g., effective transmitter). FIG. 9 shows an exemplary system 54 having transponders 46, 48, 50, and 52, and observers 34. Exemplary system 54 is similar to systems 10 and 36 in FIGS. 1 and 6-8. As explained above, each of transponders 46, 48, 50, and 52 is capable of performing RTTOF measurements with each of the other transponders 46, 48, 50, and 52. According to some embodiments, observers 34 may be similar to transponders 46, 48, 50, and 52, and may be capable of performing RTTOF measurements. According to some embodiments, observers 34 may be capable of only performing TDR_c measurements on RTTOF measurements between transponders 46, 48, 50, and 52. Other embodiments are contemplated, for example, only some of observers 34 may be capable of performing RTTOF measurements and others may be capable of performing only TDR_c measurements.

In FIG. 9, transponders 46, 48, 50, and 52 may perform RTTOF measurements for up to six transceiving pairs (as explained above in Table 1). For simplicity, the RTTOF paths are not shown in FIG. 9. From each of these RTTOF measurements, each of observers 34 can perform a TDR measurement. Therefore, from the six total RTTOF measurements between transponders 46, 48, 50, and 52, sixty TDR_c measurements (six TDR_c measurements for each of the ten exemplary observers 34) can be made. Each observer 34 can then determine its position based on the six hyperbolas unique to that observer 34. For simplicity the hyperbolas for each TDR_c measurement are omitted in FIG. 9. Although ten observers 34 are shown in FIG. 9, any number of observers could perform TDR_c measurements on the RTTOF signals. Thus, from the six RTTOF measurements, any number of observers 34 can determine its relative position, which makes system 54 infinitely scalable and very efficient. According to some embodiments, only three of transponders 46, 48, 50, and 52 could be present in system 54, or more than four transponders could be present.

According to some embodiments, three transponders, for example, transponders 46, 48, and 50 may perform RTTOF measurements (from which TDR_c measurements are calculated), and transponder 52 may perform a RTTOF distance measurement with each observer 34 in turn. In these embodiments, the RTTOF measurement between, for example, transponder 52 and one of observers 34 may be on a different frequency or channel than the RTTOF measurements for transponders 46, 48, and 50, on which TDR measurements are performed. The use of MIMO radios may be advantageous in such systems, although each observer 34 may also use two radios—one for RTTOF measurements and one for TDR_c measurements TDR_c Position Error Calculations According to some embodiments, the position error may be calculated for each TDR_c measurement. A TDR_c position error calculation represents the impact of the geometry of the measuring radio configuration on the accuracy of the TDR_c measurement results. For purposes of the description below, the position of the transponding radios is assumed to be known. For the calculations below, it is assumed that the relative locations of the transponding radios are fixed with respect to one another and that the observing radios move relative to the transponding radios. As explained above, each of the FIGS. has been shown and described in two dimensions to facilitate clarity of the drawings, although it is understood that three-dimensional solutions could be obtained using the methods disclosed herein. The error calculation below is described in three dimensions, but it is contemplated that it could also apply to two-dimensional solutions.

For a transponding radio i located at the coordinates $(x_i, y_i, z_i)$, and a mobile observer radio located at the position $(x, y, z)$, the distance, $R_i$, from a transponding radio i to the mobile radio is $$R_i = \sqrt{(x-x_i)^2+(y-y_i)^2+(z-z_i)^2}$$

The TDR_c measurement, which represents the distance between two transponding radios, i and j, can be written as $$d_{trans/obs} - d_{orig/obs} = R_i - R_j = \Delta R_{i,j} = \sqrt{(x-x_i)^2+(y-y_i)^2+(z-z_i)^2} - \sqrt{(x-x_j)^2+(y-y_j)^2+(z-z_j)^2}$$

where $d_{trans/obs}$ and $d_{orig/obs}$ are defined above. For N transponding radios, the Jacobian matrix for a TDR_c measurement, $H_{TDR\_c}$, is composed of rows representing the derivatives of observations of $\Delta R_{i,j}$. For each transponding pair, i and j, $H_{TDR\_c}$ can be abstracted as $$H_{TDR\_c} = \left[ \frac{\partial \Delta R_{i,j}}{\partial x} \quad \frac{\partial \Delta R_{i,j}}{\partial y} \quad \frac{\partial \Delta R_{i,j}}{\partial z} \right]_{i,j}$$

For explanatory purposes, below is an example Jacobian matrix, $H_{TDR\_c}$, for four transponding radios (corresponding to six inter-radio pairs).

$$H_{TDR\_c} = \begin{bmatrix} \frac{\partial \Delta R_{1,2}}{\partial x} & \frac{\partial \Delta R_{1,2}}{\partial y} & \frac{\partial \Delta R_{1,2}}{\partial z} \\ \frac{\partial \Delta R_{1,3}}{\partial x} & \frac{\partial \Delta R_{1,3}}{\partial y} & \frac{\partial \Delta R_{1,3}}{\partial z} \\ \frac{\partial \Delta R_{1,4}}{\partial x} & \frac{\partial \Delta R_{1,4}}{\partial y} & \frac{\partial \Delta R_{1,4}}{\partial z} \\ \frac{\partial \Delta R_{2,3}}{\partial x} & \frac{\partial \Delta R_{2,3}}{\partial y} & \frac{\partial \Delta R_{2,3}}{\partial z} \\ \frac{\partial \Delta R_{2,4}}{\partial x} & \frac{\partial \Delta R_{2,4}}{\partial y} & \frac{\partial \Delta R_{2,4}}{\partial z} \\ \frac{\partial \Delta R_{3,4}}{\partial x} & \frac{\partial \Delta R_{3,4}}{\partial y} & \frac{\partial \Delta R_{3,4}}{\partial z} \end{bmatrix}$$

Taking the derivative of $\Delta R_{i,j}$ in each of the x, y, and z directions yields $$\frac{\partial \Delta R_{i,j}}{\partial x} = \frac{x-x_i}{R_i} - \frac{x-x_j}{R_j}; \quad \frac{\partial \Delta R_{i,j}}{\partial y} = \frac{y-y_i}{R_i} - \frac{y-y_j}{R_j};$$

$$\frac{\partial \Delta R_{i,j}}{\partial z} = \frac{z-z_i}{R_i} - \frac{z-z_j}{R_j}$$

Substituting these values for into the Jacobian matrix, $H_{TDR\_c}$, where each row represents one transponding pair, i and j, abstractly yields $$H_{TDR\_c} = \left[ \frac{x-x_i}{R_i} - \frac{x-x_j}{R_j} \quad \frac{y-y_i}{R_i} - \frac{y-y_j}{R_j} \quad \frac{z-z_i}{R_i} - \frac{z-z_j}{R_j} \right]_{i,j}$$

For the exemplary four transponding radio example above, the Jacobian matrix becomes $$H_{TDR\_c} = \begin{bmatrix} \frac{x-x_1}{R_1} - \frac{x-x_2}{R_2} & \frac{y-y_1}{R_1} - \frac{y-y_2}{R_2} & \frac{z-z_1}{R_1} - \frac{z-z_2}{R_2} \\ \frac{x-x_1}{R_1} - \frac{x-x_3}{R_3} & \frac{y-y_1}{R_1} - \frac{y-y_3}{R_3} & \frac{z-z_1}{R_1} - \frac{z-z_3}{R_3} \\ \frac{x-x_1}{R_1} - \frac{x-x_4}{R_4} & \frac{y-y_1}{R_1} - \frac{y-y_4}{R_4} & \frac{z-z_1}{R_1} - \frac{z-z_4}{R_4} \\ \frac{x-x_2}{R_2} - \frac{x-x_3}{R_3} & \frac{y-y_2}{R_2} - \frac{y-y_3}{R_3} & \frac{z-z_2}{R_2} - \frac{z-z_3}{R_3} \\ \frac{x-x_2}{R_2} - \frac{x-x_4}{R_4} & \frac{y-y_2}{R_2} - \frac{y-y_4}{R_4} & \frac{z-z_2}{R_2} - \frac{z-z_4}{R_4} \\ \frac{x-x_3}{R_3} - \frac{x-x_4}{R_4} & \frac{y-y_3}{R_3} - \frac{y-y_4}{R_4} & \frac{z-z_3}{R_3} - \frac{z-z_4}{R_4} \end{bmatrix}$$

The unscaled covariance of the TDR observations, $P_{TDR}$, and is generally a 3×3 square matrix indicating the covariance for in the x, y, and z directions. $P_{TDR\_c}$ can be described by $$P_{TDR\_c} = (H_{TDR\_c}{}^T H_{TDR\_c})^{-1}$$

Where $H_{TDR\_c}{}^T$ represents the transpose of the Jacobian matrix $H_{TDR\_c}$. The total position error can then be represented by $$[TDR\_c \text{ Position Error}] = \sqrt{P_{11} + P_{22} + P_{33}}$$

where $P_{11}$ represents the variance in x, $P_{22}$ represents the variance in y, and $P_{33}$ represents the variance in z.

According to some embodiments, the TDR_c measurements may be augmented by a range measurement from one of the transponding radios, i, to the mobile radio. The Jacobian matrix for the range measurement between the transponding radio, i, and the mobile radio represents $$H_{range} = \begin{bmatrix} \frac{\partial \Delta R_i}{\partial x} & \frac{\partial \Delta R_i}{\partial y} & \frac{\partial \Delta R_i}{\partial z} \end{bmatrix} = \begin{bmatrix} \frac{x-x_i}{R_i} & \frac{y-y_i}{R_i} & \frac{z-z_i}{R_i} \end{bmatrix}$$

A row representing a range measurement may be combined with the Jacobian matrix representing the TDR_c measurements. Using the exemplary four transponding radio matrix above, and assuming that a range measurement is performed between the mobile radio and transponding radio 1, the combined Jacobian matrix yields $$H_{range+TDR\_c} = \begin{bmatrix} \frac{x-x_1}{R_1} - \frac{x-x_2}{R_2} & \frac{y-y_1}{R_1} - \frac{y-y_2}{R_2} & \frac{z-z_1}{R_1} - \frac{z-z_2}{R_2} \\ \frac{x-x_1}{R_1} - \frac{x-x_3}{R_3} & \frac{y-y_1}{R_1} - \frac{y-y_3}{R_3} & \frac{z-z_1}{R_1} - \frac{z-z_3}{R_3} \\ \frac{x-x_1}{R_1} - \frac{x-x_4}{R_4} & \frac{y-y_1}{R_1} - \frac{y-y_4}{R_4} & \frac{z-z_1}{R_1} - \frac{z-z_4}{R_4} \\ \frac{x-x_2}{R_2} - \frac{x-x_3}{R_3} & \frac{y-y_2}{R_2} - \frac{y-y_3}{R_3} & \frac{z-z_2}{R_2} - \frac{z-z_3}{R_3} \\ \frac{x-x_2}{R_2} - \frac{x-x_4}{R_4} & \frac{y-y_2}{R_2} - \frac{y-y_4}{R_4} & \frac{z-z_2}{R_2} - \frac{z-z_4}{R_4} \\ \frac{x-x_3}{R_3} - \frac{x-x_4}{R_4} & \frac{y-y_3}{R_3} - \frac{y-y_4}{R_4} & \frac{z-z_3}{R_3} - \frac{z-z_4}{R_4} \\ \frac{x-x_1}{R_1} & \frac{y-y_1}{R_1} & \frac{z-z_1}{R_1} \end{bmatrix}$$

It is contemplated that additional range measurements may be incorporated as additional rows in the Jacobian matrix. In such cases, a new row for each range measurement would be added to the Jacobian matrix. As before, the unscaled covariance of the TDR_c observations, $P_{range+TDR\_c}$, can be described by $$P_{range+TDR\_c} = (H_{range+TDR\_c}{}^T + H_{range+TDR\_c})^{-1}$$

and the total error for the mobile radio is represented by $$[\text{TDR\_c and Range Position Error}] = \sqrt{P_{11}+P_{22}+P_{33}}$$

It is apparent from the above calculations of position error, that the unscaled covariance, P, can be generally described by $$P = (H^T H)^{-1}$$

where the contents of the Jacobian matrix, H, are selected based on a combination of TDR_c measurements and range measurements, as described above. The generalized position error for any unscaled covariance, P, can further be generally be described by $$[\text{Position Error}] = \sqrt{P_{11}+P_{22}+P_{33}}$$

where $P_{11}$, $P_{22}$, and $P_{33}$ represent the variance of x, y, and z, respectively.

As described in greater detail below, the position error, whether based solely on TDR_c measurements or based on a combination of range and TDR_c measurements, can be used to update the position of the mobile radio.

Tracking Positions with Filters

The position of the originator device, transponder device, and/or observer devices may be tracked over time as the positions of the devices change. For example, if the transceiving devices (e.g., originator and transponder devices) are stationary, the positions of the observer devices over time can be determined based on the intersections of hyperbolas corresponding to TDR_c measurements and other measurements, as described above. Each of the positions for an observer device can be plotted over time to determine a trajectory for the observer device. The position may have some associated error, for example, the error calculations described above, which can be input for each position over time into a recursive filter to improve tracking of the observer device. According to some embodiments, the recursive filter is a Kalman filter, including but not limited to an extended Kalman filter (EKF) or an unscented Kalman filter (UKF). According to some embodiments, the recursive filter may be a particle filter.

If the positions of one or more of the transceiving devices are not stationary, such as when the originator and transponder device are moving, a filter can be used to track each of the devices in the system over time. For example, each of the originator device, the transponder device, and the observer devices may be mounted to separate moving objects, such as vehicles. According to some embodiments, the object containing the originator device may track its own position using, for example, GPS coordinates, inertial navigation systems, digital magnetic compass (DMC) measurements, or other positioning systems. Similarly, the object containing the transponder device may be tracked over time in the same way as the originator object, for example, GPS coordinates, inertial navigation systems, DMC measurements, or other positioning systems. The position error for each of the originator object and the transponder object can be tracked over time, including any position error, using a filter, such as a recursive filter (including a Kalman filter or particle filter). It is contemplated that a system may have more than one transponder object, for example, as described in the exemplary systems of this disclosure By tracking the location of the originator and transponder objects, observer objects can determine their positions relative to the originator and transponder objects using TDR_c measurements, and possibly other position aids. The relative position for each observer object to the originator and transponder object can be tracked over time. According to some embodiments, the position of the observer object at the intersection of the hyperbolas corresponding to several TDR_c measurements can be associated with one position for the observer object, with an associated position error. The system (either the observer object, one of the originator or transponder objects, a coordinator, or a centralized processing system) may use each observer device's position and associated error over time by inputting each new position into a recursive filter to track the position of the observer object. By tracking the position of all objects in the system, the system can determine the relative (or in some cases absolute) position of each of the originator object, the transponder object, and the observer objects. According to some embodiments, the observer objects may also track their position using additional position aids, for example, GPS coordinates, inertial navigation systems, DMC measurements, or other positioning systems. The use of additional position aids may further improve the position accuracy of the observer objects.

Although a single originator object and transponder object are described in this example, the use of a position tracking system and filter, such as a recursive filter, can be extended to a system containing multiple originator devices and multiple transponder devices with any number of observer devices. For example, when the system includes four transceiving devices that act as both originators and transponders for different measurements, the positions of each device (both individually and relative to the other devices) may be tracked over time using a recursive filter, such as a Kalman filter or particle filter. Similarly, several observer devices may be tracked by determining the observer devices' positions over time based on TDR_c measurements. Each TDR_c measurement may have an associated position error, as described above, which can be input into the filter to update the position of the observer device.

System Configurations

According to some embodiments, in systems 10, 36, and 54 described above, the radios may be configured to perform the function of an originator radio for a RTTOF measurement, a transponder for a RTTOF measurement, or an observer of a RTTOF measurement from which a TDR_c measurement may be performed. In other words, according to some embodiments, each radio in a system is the same as all other radios in the system. Therefore, the radios may need to know whether to function as an originator, transponder, or observer, depending on the system configuration.

System Configuration: Round-Robin RTTOF with Single Originator

Figure 10:
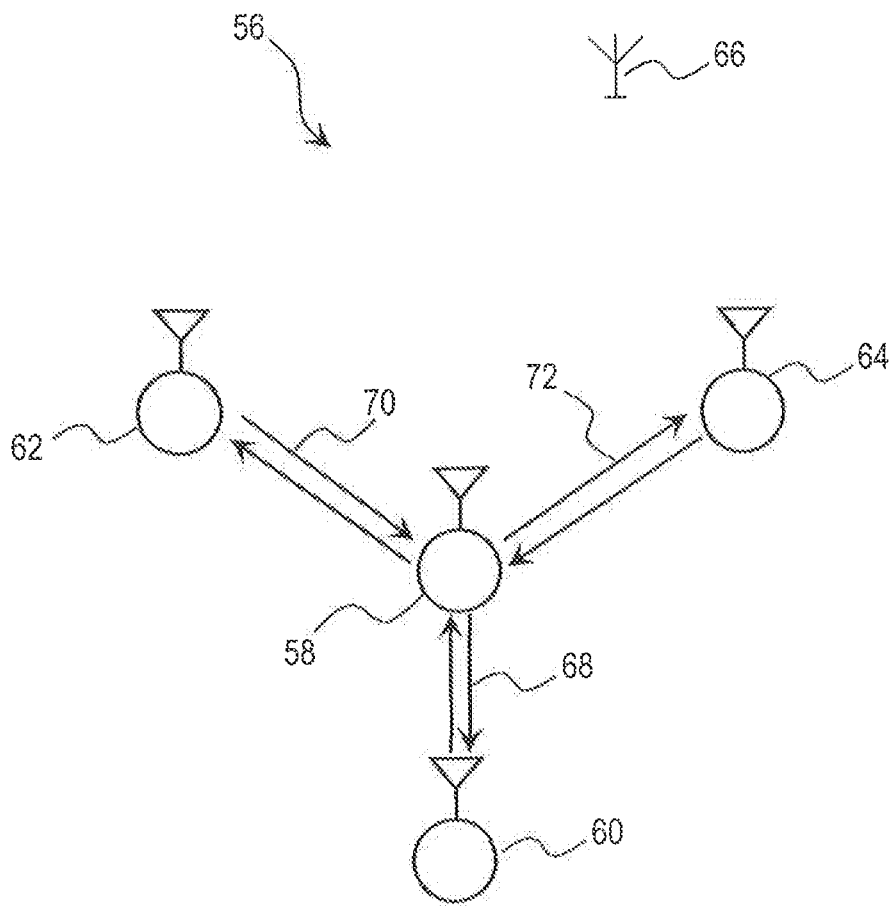
FIG. 10 is diagram of an exemplary geolocation system having an exemplary originator device.

A system, for example system 56 of FIG. 10, may include a plurality of radios 58, 60, 62, 64, and 66. According to some embodiments, one radio may be designated as a coordinator 58, and may act as a single originator device for system 56. For purposes of simplicity, coordinator 58 may represent either a radio 58 which acts also functions as a coordinator device, or a radio 58 that is coupled to a coordinator device (not shown). Coordinator 58 has its own device ID. Some or all of other radios 60, 62, 64, and 66 may have their own device ID. It is preferred that each device ID is a unique ID.

According to some embodiments, the coordinator device is not a radio, but rather a computer or processing device separate from the radios that instructs the radios to perform RTTOF measurements, as described. According to some embodiments, a coordinator may be a set of instructions implemented on one or more processors, for example, processors coupled to each of radios 58, 60, 62, and 64, and instructing each of radios 58, 60, 62, and 64 to perform RTTOF measurements as described below.

Coordinator 58 serves as the originator for each RTTOF measurement in exemplary system 56 and sends a measurement request packet to another radio (e.g., one of radios 60, 62, 64, and 66), and identifies the desired target transponder radio for the RTTOF measurement by placing the target's ID in the destination address of the measurement request packet, as described above with reference to FIG. 3. For example, coordinator 58 may initiate a RTTOF measurement 68 with radio 60 by placing radio's 60 ID in the destination address of the measurement request packet. Each radio that is not the coordinator (e.g., radios 60, 62, 64, and 66) may be defaulted to a listening mode to receive the measurement request packet. Thus, all other radios will receive the measurement request packet and determine whether the destination address matches the radio's own ID. If the destination address matches the radio's own ID, the radio will act as a transponder (e.g., radio 60 in this example) and will complete RTTOF measurement 68 by sending a measurement reply packet. If the destination address does not match the radio's own ID, the radio may act as an observer (e.g., radios 62, 64, and 66 in this example) and may perform a TDR_c measurement, as described above.

According to some embodiments, after performing a RTTOF measurement with radio 60, coordinator 58 may broadcast the values (e.g., time-of-flight or distance) for RTTOF measurement 68 to each of the other radios 62, 64, and 66. Broadcasting the values may occur as a secondary wireless message or data transmission, from which radios 62, 64, and 66 can finish the TDR_c measurement.

After broadcasting the values for the RTTOF measurement 68, coordinator 58 may initiate RTTOF measurement 70 with radio 62, in which the destination address of the measurement request packets contains radio's 62 ID. During RTTOF measurement 70, radio 62 will act as a transponder, and radios 60, 64, and 66 may perform TDR or TDR_c measurements based on the transmitted signals for RTTOF measurement 70. After performing RTTOF measurement 70, coordinator 58 may broadcast the values (e.g., time-of-flight or distance) for RTTOF measurement 70 to each of the other radios 60, 64, and 66, from which radios 60, 64, and 66 may complete their respective TDR_c measurements. Coordinator 58 may then initiate RTTOF measurement 72 with radio 64 in a similar manner, broadcasting the results of RTTOF measurement 72 to the other radios.

According to some embodiments, coordinator 58 may also perform a RTTOF measurement (not shown) with radio 66 and broadcast the results to radios 60, 62, and 64. According to some embodiments, radio 66 may only perform TDR_c measurements, for example, if coordinator 58 does not know radio's 66 ID or if radio 66 is a passive radio that can only receive transmissions.

After RTTOF measurements 68, 70, and 72 are performed, each of radios 60, 62, and 64 will possess information about its own RTTOF measurement with coordinator 58 and two TDR_c measurements, and radio 66 will possess information about three TDR_c measurements. From this accumulated data, each non-coordinator radio (e.g., radios 60, 62, 64, and 66) may determine its unique position relative to the other radios and coordinator 58.

According to some embodiments, the broadcast signal from coordinator 58 reporting the results of a RTTOF measurement is a generic signal, received by all radios. The broadcast signal may be a data message packet or data transmission, as described in greater detail below.

According to some embodiments, each of coordinator 58 and radios 60, 62, 64, and 66 may include additional positioning systems which augment, or are augmented by, the RTTOF and/or TDR_c measurements. Additional positioning systems may include inertial navigation systems, for example inertial measurement units (IMUs); DMC systems; or global navigation satellite system (GNSS). Examples of GNSS systems include, but are not limited to, global positioning systems (GPS), GLONASS, GALILEO, COMPASS, and quasi-zenith satellite systems (QZSS). Other positioning systems are also contemplated.

System Configuration: Round-Robin RTTOF with Multiple Originators

Figure 11:
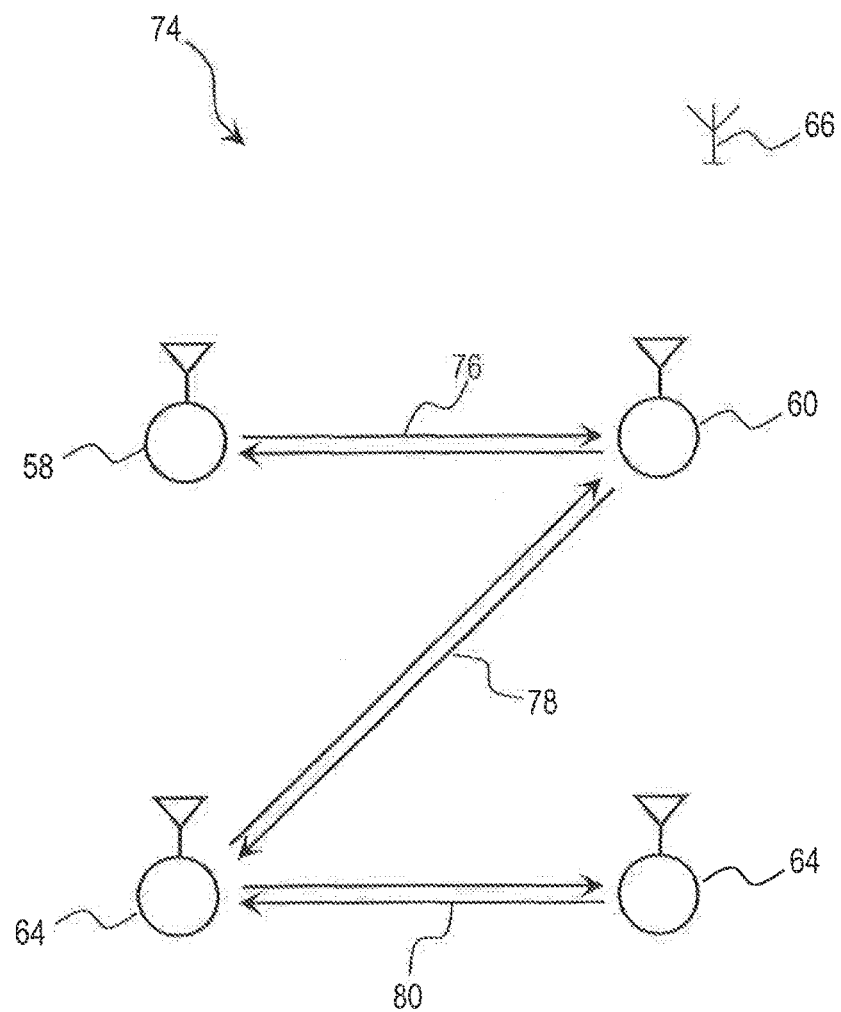
FIG. 11 is diagram of another exemplary geolocation system having an exemplary observer device.

A system, for example, system 74 of FIG. 11, may include a plurality of radios 58, 60, 62, 64, and 66. System 74 may also contain a coordinator. According to some embodiments, the coordinator is a radio, for example, radio 58. According to some other embodiments, the coordinator is a device external to one or more of radios 58, 60, 62, 64, and 66, which instructs the radios 58, 60, 62, 64, and 66 to perform a series of RTTOF measurements as described below. According to some embodiments, the coordinator is a software program, which may be implemented on a single device, or may be shared among the several devices corresponding to radios 58, 60, 62, and 64. The software may also be shared by radio 66, according to some embodiments.

In system 74, some or all of other radios 58, 60, 62, 64, and 66 may have their own device ID. It is preferred that each device ID is a unique ID. To perform multiple RTTOF measurements, the coordinator may instruct radio 58 may serve as the originator for a RTTOF measurement by sending a measurement request packet to another radio (e.g., one of radios 60, 62, 64, and 66). Radio 58 may identify the desired target transponder radio for the RTTOF measurement by placing the target's ID in the destination address of the measurement request packet, as described above with reference to FIG. 3. For example, the coordinator may instruct radio 58 to initiate a RTTOF measurement 76 with radio 60. Each radio that did not initiate the RTTOF measurement 76 (e.g., radios 60, 62, 64, and 66) may be defaulted to a listening mode to receive the measurement request packet. Thus, all radios will receive the measurement request packet and determine whether the destination address matches the radio's own ID. If the destination address matches the radio's own ID, the radio will act as a transponder (e.g., radio 60 in this example) and will complete RTTOF measurement 76 by sending a measurement reply packet. If the destination address does not match the radio's own ID, the radio will act as an observer (e.g., radios 62, 64, and 66 in this example) and will perform a TDR measurement, for example, as described above. Radio 58 may then transmit the results of RTTOF measurement 76 to the other radios in system 74. According to some embodiments, radio 58 may send the results of RTTOF measurement 76 to an external device (not shown) for transmission to radios 60, 62, 64, and 66.

Unlike system 56 of FIG. 10, in system 74 radios other than radio 58 may also serve as originator radios for a RTTOF measurement. In system 74, after radio 58 completes RTTOF 76, the coordinator may instruct another radio to act as the originator for a new RTTOF measurement. For example, the coordinator may instruct radio 60 to initiate RTTOF measurement 78 with radio 64. According to some embodiments, the coordinator may specify the new originator radio and new target radio, which may be placed in the data message packet as part of a measurement request packet, or when transmitting the data results for RTTOF measurement 76. Radio 60 may then transmit the measurement request packet for RTTOF measurement 78.

According to some embodiments, when the coordinator if a transmitting device, for example, radio 58, upon receiving the data message packet for RTTOF measurement 76 identifying radio 60 as the originator for the next RTTOF measurement, radio 60 may send a response measurement to the coordinator (e.g., radio 58). According to some embodiments, the transmission of measurement request packet for RTTOF measurement 78 also functions as an acknowledgment by radio 60 of a coordinator's instructions to initiate a new measurement.

In system 74, radio 60 functions as the originator radio for RTTOF measurement 78. Radio 60 transmits a measurement request packet containing radio's 60 ID as the source address of the measurement request packet and radio's 64 ID as the destination address. When radios 58, 62, 64, and 66 receive the measurement request packet for RTTOF measurement 78, each radio will check the destination address and determine whether it matches the radio's own ID. If the destination address matches the radio's own ID (i.e., radio 64), then the radio functions as a transponding radio and completes RTTOF measurement 78 by sending a measurement reply packet. If the destination address does not match the radio's own ID (i.e., radios 58, 62, and 66), then the radio may function as an observing radio and perform a TDR_c measurement corresponding to RTTOF measurement 78, for example, as described above with reference to FIG. 4.

Upon receiving the reply measurement packet from radio 64, originator radio 60 may calculate the RTTOF and may transmit the results to the coordinator. The coordinator may store the results or may broadcast the results to each of the other radios in system 74. According to some embodiments, originator radio 60 broadcasts the results to all other radios in system 74, for example, when the coordinator is an external device without a radio or is not a physical device (e.g., shared software).

When the results of RTTOF measurement 78 are broadcast to the other radios, the data message packet or data transmission may also identify the next transceiving radio pair. For example, the coordinator may instruct radio 62 to perform RTTOF measurement 80 with radio 64, via a data message packet, data transmission, or as part of the execution of coordinator software which may be executed on radio 62. Upon receipt of the data message packet, radio 62 then originates and performs RTTOF measurement 80 with radio 64, in a manner similar to radios 60 and 62 in RTTOF measurement 78.

The coordinator may continue to instruct various transceiving radio pairs to perform additional RTTOF measurements.

According to some embodiments, when the coordinator corresponds to a particular device or radio, any RTTOF measurement in which coordinator radio is one of the transceiving radios, the coordinator radio will always function as the originator for the RTTOF measurement.

According to some embodiments, when the coordinator corresponds to a device having a radio, the coordinator may compare the source address and destination address for each leg of a RTTOF measurement with the originator and target IDs transmitted in the last data message packet (i.e., the radios that the coordinator identified as the transceiving radio pair for the next RTTOF measurement). If the addresses to not match, the coordinator device may broadcast a reset message to all radios to disregard the RTTOF transmissions.

According to some embodiments, the coordinator may instruct another transceiving radio to perform more than one RTTOF measurement with one or more other radios. For example, the coordinator may instruct radio 60 to originate and perform ten RTTOF measurements with radio 62 as a transceiving pair; or the coordinator may instruct radio 60 to originate and perform four RTTOF measurements with radio 62 as a transceiving pair and four RTTOF measurements with radio 64 as a transceiving pair. According to some embodiments, when the coordinator instructs a radio to perform more than one RTTOF measurement, the results of every RTTOF measurement may not be transmitted to the coordinator or the other radios until all RTTOF measurements are completed. Therefore, according to some embodiments, the number of RTTOF measurements that the coordinator may instruct a radio to perform may be limited to the number of RTTOF data results that can be transmitted to the coordinator or the other radios in a single data message packet or data transmission.

According to some embodiments, the coordinator may instruct multiple transceiving radios to sequentially perform more than one RTTOF measurement with at least one other radio. For example, when the coordinator is shared software, the coordinator software may contain a list of or sequence of RTTOF measurements. According to some embodiments, the coordinator may instruct a radio via a list of transceiving radio pairs (for example, unique ID numbers) as part of a data message packet to a first originator radio in the list. The first originator radio performs a RTTOF measurement with the corresponding transponder radio from the list, as described above. Other radios may perform TDR_c measurements on the RTTOF measurement. Rather than the coordinator sending the next originator radio in the list an instruction to perform a new RTTOF measurement, the first originator may remove the first entry in the list (i.e., the entry for the RTTOF measurement just performed) and send the remaining list entries to the next originator radio to perform the next RTTOF measurement. This process continues until each of the transceiving pairs in the list has performed each of the RTTOF measurements. According to some embodiments, the updated list may be transmitted as part of the measurement request packet. According to some embodiments, when the coordinator is, for example, shared software, each radio in the system may simply step to the next transceiving pair identified in the software.

According to some embodiments, list may be constructed such that one particular radio is always the originator for the last transceiving pair in the list, for example, when the coordinator corresponds to this radio. The coordinator may perform a check to see if the transceiving pair list is empty. If the list is empty, the coordinator may create a new list and the process may be repeated.

According to some embodiments, the coordinator may compare subsequent RTTOF measurements (for example, in conjunction with a TDR measurement) with each transceiving pair in the original list transmitted by the coordinator. In this way, the coordinator can independently determine whether the RTTOF measurements are being performed by the appropriate transceiving pairs. Once the coordinator observes the last RTTOF measurement, it may generate a new transceiving pair list and initiate a new round of RTTOF measurements.

According to some embodiments, when a radio in system 74 performs a TDR_c measurement (e.g., radio 66), the measurement is stored in memory. The radio may subsequently provide the TDR_c measurement data to the coordinator upon a request from coordinator. For example, after completion of all RTTOF measurements in a transceiving pair list, the coordinator may instruct a radio (e.g., radio 58) issue a request to all radios in system 74 to transmit each radio's TDR_c measurements. According to some embodiments, radios may transmit their TDR_c packets to one particular radio or to the coordinator, after a specified number of TDR_c measurements are recorded or after a specified period of time. TDR_c measurement data may also contain the radio's own ID and a time stamp for each TDR_c measurement. Knowing the time stamp and device IDs for each TDR_c measurement, a coordinator can assemble the TDR_c and RTTOF data to determine the position of each radio in system 74 at each time stamp. As described above, the position determination for each radio in system 74 will be relative to the other radios based on the TDR_c and RTTOF measurements alone. However, additional positioning data, such as GNSS, inertial navigation data, or DMC data can be used to determine the absolute position of each radio in system 74.

System Configuration: RTTOF Scheduling without a Coordinator

According to some embodiments, RTTOF measurements may be performed without a coordinator. For example, a transponder device, for example, radio 58 of FIG. 11, may listen to determine whether a RTTOF measurement has been initiated by another device, for example, one of radios 60, 62, or 64. For example, a radio may use a carrier sense multiple access (CSMA) protocol to determine whether a RTTOF measurement has already been initiated. If radio 58 determines that a RTTOF measurement has been initiated by another device, radio 58 may function as a transponder or an observer.

If, however, radio 58 determines that a RTTOF measurement has not been initiated by another device, then radio 58 may initiate a RTTOF measurement by transmitting a measurement request packet to another device. For example, radio 58 may initiate RTTOF measurement 76 with radio 60, as described above. Each other radio in, for example, FIG. 11, may receive the measurement request packet for RTTOF measurement 76 and will not initiate a new RTTOF until the message reply packet has been transmitted back to radio 58. Radios 60, 62, and 64 may have similar functionality to radio 58 in that they may determine whether a RTTOF has been initiated, for example, by listening for measurement request packets, and may initiate a RTTOF measurement if the radio determines that a RTTOF measurement has not been initiated.

According to some embodiments, if two radios simultaneously initiate a RTTOF measurement (e.g., two measurement request packets may be transmitted), causing a "collision" of measurement request packets. When a collision occurs on the same wireless channel, the devices in the system may treat the collision as a measurement failure and may discard the measurement request packets. Each device may then reset, listen to determine whether a new RTTOF has been initiated, as described above. To prevent another collision, each device may have a "backoff time" after the collision that it waits before listening to determine whether a RTTOF has been initiated. The backoff time staggers the listening of each device to prevent future collisions. According to some embodiments, the backoff time for a device may be a random or pseudorandom time delay.

According to some embodiments, when a collision occurs for two measurement request packets on different channels, it may be possible for the devices to process both packets. For example, priority may be given to certain originator devices. For example, if radio 58 has a higher priority than radio 62, a RTTOF measurement initiated from radio 58 will be processed by each other radio, as described above, and the collision measurement request packet from radio 62 may be ignored or discarded.

According to some embodiments, if two measurement request packets are received on different channels, a processor device or processing unit in each object of system 74 may process both measurement request packets, as described above, and the object may correspondingly act as a transponder or observer for each. In these embodiments, the starting and stopping of the measurement time clock, described in FIGS. 2-4, may correspond to recording values for clock cycles of a continuous clock. For example instead of starting a measurement time clock at one of steps 204, 304, or 402, the object may have a continuously running clock and may record the clock cycle count (or time stamp) at one of steps 204, 304, or 402, as described above. Similarly, the object may also record the clock cycle count (or time stamp) at one of steps 209, 316, or 406, rather than stopping the measurement time clock. In this way, a transponder or observer object can coordinate multiple RTTOF, TDR, and/or TDR_c measurements using a single clock. It is also contemplated that a different clock may be used for each channel.

Performing multiple RTTOF, TDR, and/or TDR_c measurements without a coordinator is also facilitated by the destination address and source addresses of the measurement request and reply packets. Because each RTTOF measurement has a unique set of destination and source addresses, an object can appropriately filter clock cycle counts (or time stamps) for each measurement packet using the destination and source addresses, using the principles described herein.

System Configuration: Multiple Transponder Responses to Single Originator

Figure 12:
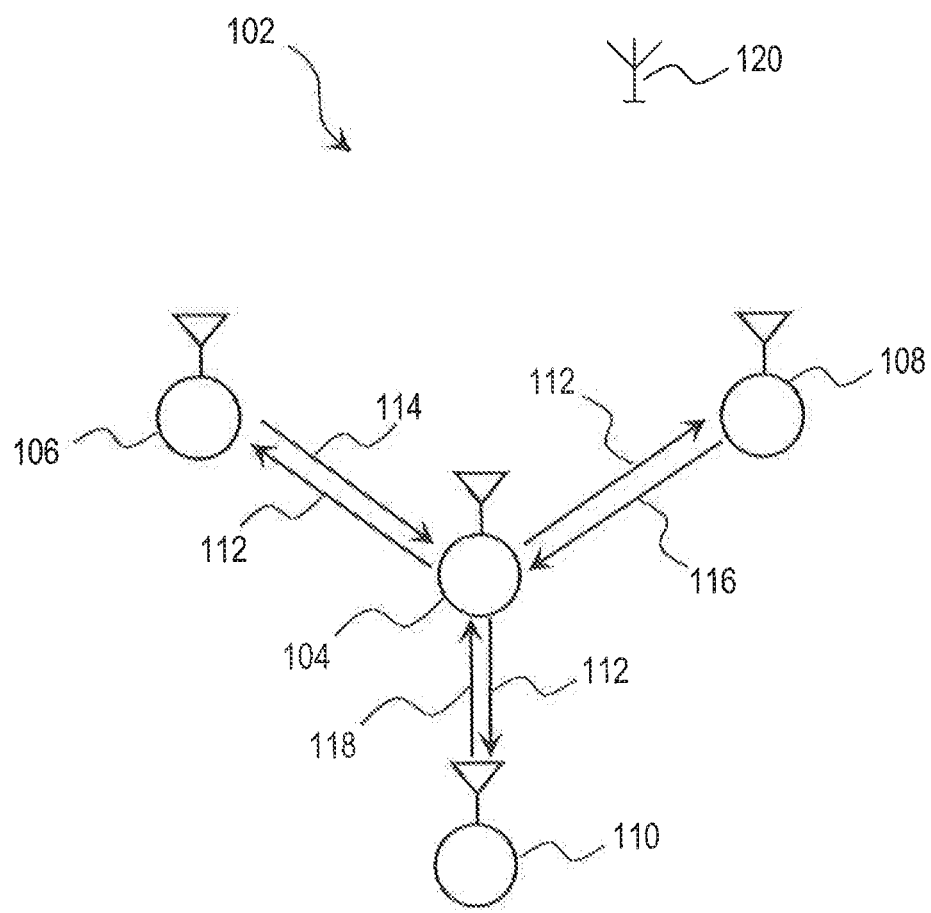
FIG. 12 is a diagram of another exemplary geolocation system.

According to some embodiments, a single originator may perform multiple RTTOF measurements with several transponders by only transmitting one message request packet, for example, system 102 or FIG. 12. In system 102, originator radio 104 transmits a measurement request packet to transponder radios 106, 108, and 110 via wireless transmission 112. Each of transponder radios 106, 108, and 110 then prepare a separate measurement reply packet and transmit the responses to originator radio 104 via wireless transmissions 114, 116, and 118, respectively. Each of transponder radios 106, 108, and 110 may be instructed to delay transmission of its corresponding measurement reply packet for a predetermined period of time. For example, transponder radio 106 may be instructed to delay wireless transmission 114 for a first predetermined time. Similarly, transponder radios 108 and 110 may be instructed to delay wireless transmissions 116 and 118 for a second and third predetermined time, respectively. Originator 104 then uses each of the measurement request packets from transponder radios 106, 108, and 110 to calculate three RTTOF measurements, one for each transponder radio, based on the single measurement request packet transmitted in wireless transmission 112. Originator radio 104 may then broadcast the results of each RTTOF measurement to radios 106, 108, 110, and 120. This system configuration prevents originator 104 from having to initiate three sequential RTTOF measurements, thereby decreasing the amount of time necessary to perform all of the RTTOF measurements.

Observer radio 120 can observe the measurement request packet sent in wireless transmission 112 and the three measurement reply packets sent in wireless transmissions 114, 116, and 118. Observer radio 120 can then perform three TDR_c measurements, as described above, one for each RTTOF measurement. For example, observer radio 120 may receive the measurement request packet and start an internal clock, as described above with reference to FIGS. 2 and 3. Observer 120 may then receive measurement reply packets from transponder radios 106, 108, and 110, and may record a corresponding time stamp for each received measurement reply packet, which contains the turn-around time (including any transmission delay time) for each of transponder radios 106, 108, and 110. Observer radio 120 may then use the measurement request packet, each of the measurement reply packets, and any broadcast RTTOF information from originator radio 104 to calculate TDR_c measurements for each transceiving radio pair (i.e., radios 104 and 106, radios 104 and 108, and radios 104 and 110). Thus, from a single measurement request packet, observer radio 120 can perform three TDR_c measurements, one for each measurement reply packet. Although only three transponder radios are shown in FIG. 12, it is contemplated the a different number of transponder radios may be used to perform RTTOF measurements, for example, two transponder radios or four transponder radios. Although only one observer radio is shown in FIG. 12, it is contemplated that any number of observer radios may observe the RTTOF measurements and calculate TDR_c measurements.

After RTTOF measurements originating from originator radio 104 are complete, a different radio, for example, transponder radio 106 may transmit a measurement request packet to radios 104, 108, and 110, which may each send a measurement reply packet back to transponder radio 106. Therefore, the function of originator radio in system 102 may be passed between the various radios shown in FIG. 12. Methods of determining which radio will become the next originator radio are discussed elsewhere in this disclosure. According to some embodiments, one radio, for example, originator radio 104 may also be a coordinator device for system 102.

According to some embodiments, the measurement request packet may include destination addresses for several transponder radios. By including several destination addresses, originator radio 104 can determine when all measurement reply packets from the transponder radios have been received. When preparing each measurement reply packet, each transponder radio uses only its own ID as the source address and uses the originator radio's 104 ID as the destination address. This ensures that originator radio 104 can correlate the measurement reply packets with each of the transponder radios to complete each RTTOF measurement.

The predetermined delay time for each transponder radio may be determined by several methods. According to some embodiments, each of transponder radio's 106, 108, and 110 delay time may correspond to a fixed turn-around time for that radio. According to some embodiments, each of transponder radio's 106, 108, and 110 delay time may correspond to a specified delay after the transponder radio has prepared the measurement reply packet. Thus, the turn-around time may be variable for each transponder radio. According to some embodiments, the delay time for each transponder radio may be specified by the originator radio and sent to each of the transponder radios. For example, originator radio 104 may specify the delay time in a data message packet, which is transmitted with the measurement request parted as part of wireless signal 112. The originator radio may select a delay time for a particular transponder radio based on a previous RTTOF measurement with the transponder radio or based on the position of the transponder radio. According to some embodiments, the delay time for each transponder radio may be selected to prevent two measurement reply packets from arriving simultaneously at the originator radio.

Transmission of Data Message Packets

As described above, certain data (e.g., RTTOF measurement data, TDR_c measurement data, transceiving pairs for a RTTOF measurement, or originator and transponder identification by a coordinator radio) may be transmitted as part of a data message packet. Data message packets may be included as part of a measurement request packet or measurement reply packet.

Figure 13:
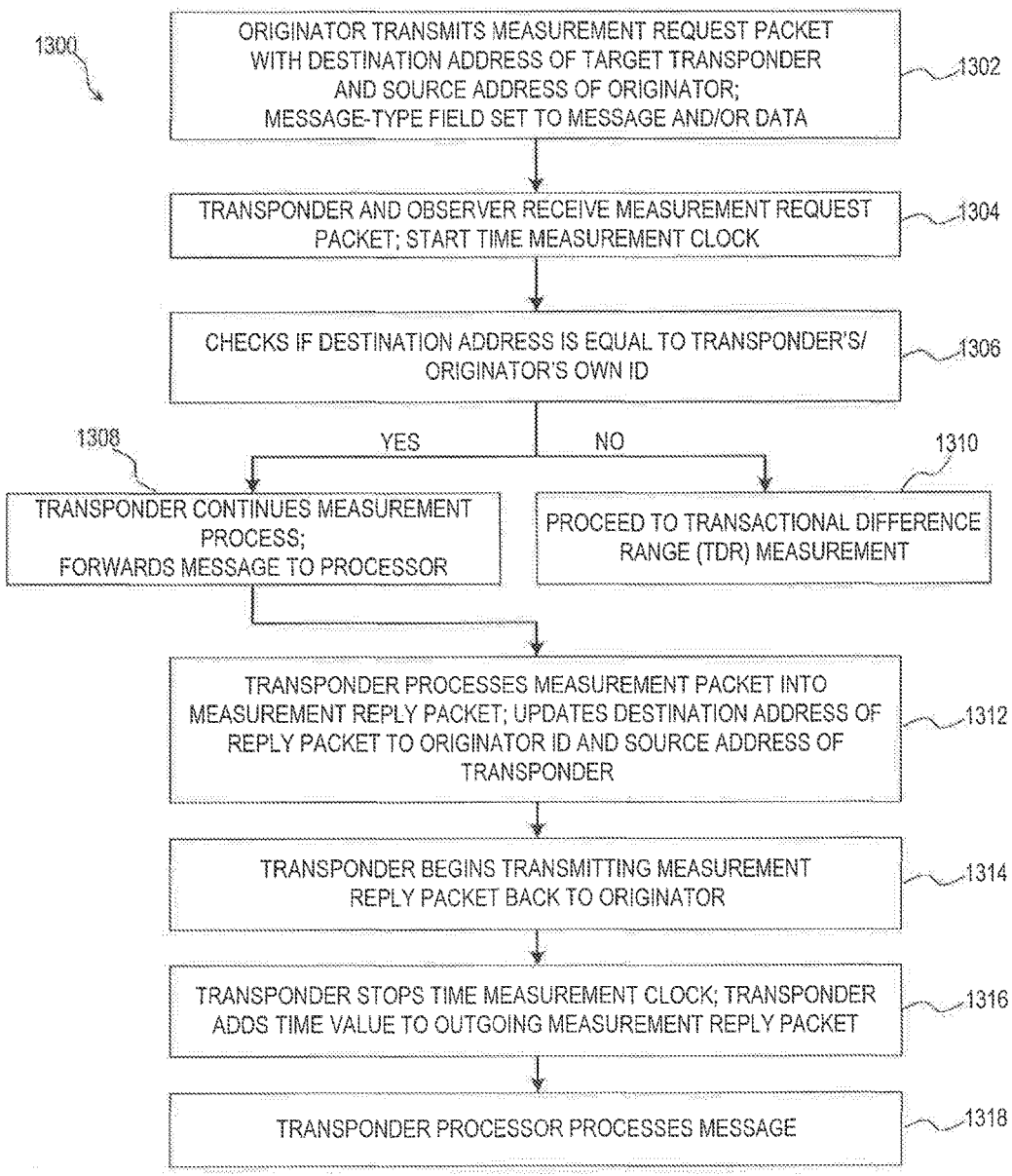
FIG. 13 is an exemplary method for receiving and processing data message packets.

FIG. 13 shows an exemplary data message packet processing method 1300. In FIG. 13, the data message packet is transmitted as part of a measurement request packet from an originator device to a transponder device. At step 1302, an originator device transmits a measurement request as part of a wireless signal to a target transponder device. The wireless signal may be received by more than one device, for example, observer devices and other potential transponder devices. The measurement request packet transmitted at step 1302 contains a source address and a destination address. The source address represents the ID of the originator, which transmits the measurement request packet. The destination address represents the ID of the transponder, which transmits a measurement reply packet. As described herein, observer devices or other potential transponder devices may be passive observers and the originator may, or may not, be aware of the presence of these devices. At step 1302, the originator device initiates a range measurement between itself and the transponder device. However, because the transponder device and an observer device may be the same (or similar) type of device, each recipient of the measurement request packet in the wireless signal may need determine whether it should provide a measurement reply packet. At step 1304, the transponder device and any potential observer devices receive the measurement request packet. According to some embodiments, each of the transponder device and any observer devices may start an internal clock upon receipt of the measurement request packet from the originator device, for example, upon receipt of a synchronization word in the measurement request packet. The transponder device or observer devices may also determine a phase value for the measurement request packet, such as a phase corresponding to the synchronization word. As described above, with reference to FIGS. 2 and 3, the transponder device begins a clock in order to determine or record the turn-around for the transponder device. Any observer devices may also begin a clock to perform a TDR measurement.

At step 1306, each of the transponder device and observer devices determine whether the destination address of the measurement request packet is the same as the transponder device's or observer device's own ID, respectively. If the destination address matches transponder device's own ID, then the method proceeds to step 1308, where the transponder device processes the measurement request packet into a measurement reply packet. Also at step 1308, the transponder device may forward any message or data information contained in the measurement request packet to a processor. According to dome embodiments, message or data information contained in the measurement request packet may be forwarded to a processor regardless of whether the destination address matches the ID, for example as part of step 1306. If the destination address does not match the ID for the device (e.g., the device is an observer), then the method proceeds to step 1310, where a TDR measurement is performed and a TDR_c measurement may be determined. A process for performing a TDR and TDR_c measurements is described above.

From step 1308, the method proceeds to step 1312 for processing of the measurement request packet into a measurement reply packet by the transponder device. At step 1312, the transponder device sets the destination address for the measurement reply packet to the source address from the measurement request packet-which is the address for the originator device. The transponder device also sets the source address of the measurement reply packet equal to the transponder device's own ID. According to some embodiments, the transponder device may calculate a peak error value for the incoming wireless signal received from the originator device and may add this value to the measurement reply packet.

When processing at step 1312 is complete, the method proceeds to step 1314 and the transponder device begins transmitting the measurement reply packet back to the originator device. At step 1316, upon transmission of the synchronization word, the transponder device stops the time clock that it started in step 1304 and adds a value indicative of the turn-around time to the measurement reply packet. For example, the transponder device may insert a value for the actual time elapsed during processing, a clock cycle count value that represents the number of clock cycles between when the transponder device began the time measurement in step 1304 and stopping the time measurement in step 1316, or an indication of the first and last clock cycle values from which the total number of clock cycles can be ascertained. According to some embodiments, the transponder device also adds the measured phase value to the measurement reply packet.

At step 1318, the processor transponder device processes the message or data from step 1308 (or according to some embodiments, step 1306 as described above). It is contemplated that if the receiving device (e.g., transponder or observer device) forwards the message or data to a processor regardless of whether the destination address matches the devices own ID, then the message or data may be processed after either sending a measurement reply packet or performing a TDR measurement. According to some embodiments, the message or data may be processed in parallel with completing a RTTOF measurement by sending a measurement reply packet or in parallel with performing a TDR measurement.

As described above, for example, with reference to FIG. 3, the originator device may also complete the RTTOF measurement based on the measurement reply packet from the transponder device.

Although FIG. 13 is described as part of an RTTOF and/or TDR measurement, it is contemplated that the general concepts of receiving and processing a data message packet may be applied in contexts outside of an RTTOF or TDR measurement.

During processing of the data message packet, the processor may perform certain tasks or calculations based on the contents of the data message packet. For example, if the data message packet instructs a device to act as an originator in a RTTOF measurement, the processor may adjust certain settings of the device in preparation for sending a measurement request packet, such as turning preparing the contents of the measurement request packet or adjusting various power settings. Exemplary contents for data message packets are described in greater detail below.

Content and Processing of Data Message Packets

Data message packets may be used for many purposes. Some exemplary purposes are described below, however, it is contemplated the other contents for data message packets are also possible. According to some embodiments, some data message packets may be processed only when the destination address matches the receiving device's own ID, for example, if the data message packet instructs the device to initiate a RTTOF measurement. According to some embodiments, some data message packets may be processed regardless of whether the destination address matches the receiving device's own ID, for example, all receiving devices may transmit TDR_c data upon receiving a data request in a data message packet. According to some embodiments, where a coordinator compiles TDR_c data to determine the position of each object in a system, the uncorrected TDR data may be transmitted as part of the a data message packet to the coordinator.

A determination whether to process a data message packet may be performed in the processor of the receiving device. For example, the data message packet may also contain one or more destination address fields (which, according to some embodiments, may be different from the destination address field of the measurement request packet). The processor may compare the data message packet's destination address(es) with the device's own ID, and if one of the destination addresses matches the device's own ID, the data message packet will be processed. If the destination address does not match the device's own ID, the data message packet may be discarded or ignored. According to some embodiments, each device may also include a "group ID," which may be compared to a corresponding field (which may be the same or different from a destination address field in a data message packet). If the group ID matches the device's own group ID, then the data message packet will be processed. If the group ID does not match the device's own group ID, the data message packet may be discarded or ignored. According to some embodiments, a group ID may be coextensive with only one device's own ID. According to some embodiments, a device may have more than one group ID. According to some embodiments, the group ID may be inserted into the destination address field, and each receiving device may compare the destination address to the device's own ID and any group IDs which correspond to the device.

According to some embodiments, a data message packet may be broadcast to all receiving devices for processing, regardless of the device's own ID. In this situation, the address field may be empty or null (if the data message packet also contains a group ID, the group ID may also be empty or null). If a receiving device determines that the destination address (and group ID, if available) is empty of null, the processor may process the data message packet. According to some embodiments, all devices in a system may share one group ID. When one group ID is shared by all devices in a system, the coordinator may send those devices to perform certain functions via a data message packet, but unlike an empty or null destination address, new or unknown devices receiving message may not process the data message packet.

As described above, a data message packet may be used to transmit instructions for another radio to initiate one or more RTTOF measurements with other radios. It may also include a list of transceiving radio pairs to instruct multiple radios to perform RTTOF measurements. When a data measurement packet requesting that the device initiate a RTTOF measurement, the processor may modify the settings of the device. For example, the device previously have been in a "listening mode" or "observer mode" in which the device monitored incoming measurement request packets and measurement reply packets from other radios and performed TDR measurements, as described above. The device may also have been in a "listening mode" and waiting for a measurement request packet from an originator device. When the processor processes the data message packet, it may change the settings of the device to a "transmitter mode" and prepare a measurement request packet. For example, the processor may construct a measurement request packet by inserting the device's ID in the source address and the desired transponder device's ID in the destination address. According to some embodiments, the processor may also modify a list of transceiving radio pairs, as described above, and add the modified list to the measurement request packet.

According to some embodiments, the data message packet may include a request for one or more devices to transmit RTTOF or TDR_c measurement data to a specific device, for example, a coordinator device. Upon receipt of the data message packet, the processor may change the device's state from a listening state to a transmission state. The processor may also format a data transmission packet with RTTOF and/or TDR_c measurement data. The data transmission packet may include a larger data payload to accommodate several data measurements. According to some embodiments, a data transmission packet may include a destination address (for example, the coordinator's own ID) and a source address (for example, the receiving device's own ID). The use of a destination address and source address may aid the coordinator in segregating the data transmission packets by device. The data transmission packet also includes payload data, which may be composed of RTTOF and/or TDR_c measurement data. The RTTOF and/or TDR_c measurement data may include a time stamp for the measurement. The time stamp may correspond to the origination time for the RTTOF measurement from which the RTTOF or TDR_c data was developed. The payload may also include the originator address (e.g., originator device ID) and destination address (e.g., transponder device ID) for each measurement. The payload data will also contain the data for each RTTOF and/or TDR_c measurement, for example, the payload data may contain time-of-flight information (e.g., time or distance) between an originator and a transponder, or may contain TDR_c-related data such as $d_{trans/obs}-d_{orig/obs}$ or $t_{trans/obs}-t_{orig/obs}$ data, described above. According to some embodiments, when the a coordinator determines the positions of each observer device based on TDR_c measurements, each observer device may transmit the "raw" or uncorrected TDR data, e.g., $\Delta t_{TDR}$, described above. When the "raw" or uncorrected TDR data is transmitted, the coordinator device may use known RTTOF data to calculate the corrected TDR values, TDR_c, for each of the uncorrected TDR measurements. According to some embodiments, the payload data may include additional positioning measurements, such as inertial navigation data, DMC data, or GNSS data. The processor may then instruct the device to transmit the data transmission packet to the coordinator device.

According to some embodiments, a data message packet may include instructions to wait for reception of a data transmission packet from a coordinator or another radio. When processing this type of data message packet, the processor may change the receiving device's mode to a listening mode. If the receiving device was also instructed to initiate and RTTOF measurement, the RTTOF measurement may be delayed until after the data transmission packet is received. While in listening mode, the device that received the instructions to wait for a data transmission packet checks each incoming transmission and determines whether the source address is the same as the coordinator (e.g., if the coordinator corresponds to a device with an ID) or is the same as the device which is supposed to send the awaited message. If the source address is not the same as the expected ID, the receiving device may discard or ignore the transmission and may continue to listen for the data transmission packet. According to some embodiments, if the source address matches the expected ID, the receiving device may determine whether the structure of the transmission corresponds to a data transmission packet—for example, if data transmissions have a different structure from measurement request packets or measurement reply packets. If the structure matches a data transmission packet, the processor may store and/or process the data in the data transmission packet. The processor may then change the device's settings to listen for a new measurement request packet, or to initiate a new RTTOF measurement if the device was previously instructed to initiate a new RTTOF measurement and had not yet done so.

According to some embodiments, a data message packet may be used to change a device setting on one or more devices receiving the data message packet. As explained above, a destination address (or group address) may identify a specific device ID (or group ID) or may indicate that all devices should change the device setting (such as through an empty or null destination address). Upon processing the data message packet, the processor of the receiving device may instruct the device to change a setting or perform the action described in the data message packet. For example, a data message packet could be used to instruct a device to change the transmission power of the device, or to instruct the device to enter an originator mode, a transponder mode, or an observer mode. A data message packet may also be used to instruct the receiving device to receive or transmit on a specified channel or frequency, or to ignore or discard transmissions received on a specified channel or frequency. According to some embodiments, the data message packet may instruct the receiving device to change modulation properties or coding schemes. Other setting changes are also contemplated.

According to some embodiments, a data message packet may be used to request a device ID list. A request for a device ID list may be sent by a coordinator device. The data message packet may request that devices receiving the communication (or devices within a specified group) transmit its device ID and may request group IDs, if they system includes group ID capabilities. Once processor processes the data message packet, it may construct a response data transmission packet. The data transmission packet may include a destination address corresponding to the device requesting the node or device list and a source address corresponding to the device transmitting its own device ID (and possible group IDs). The device ID (and group IDs, if any) may be added to a data payload in the transmission data packet. The processor may then instruct the device to transmit the data transmission packet to the coordinator device. The coordinator device may then construct a device ID list based on the device IDs and group IDs in the response data packets sent to the coordinator device. According to some embodiments, the coordinator device may send the device IDs and group IDs to an external device, such as an external processor or computer. According to some embodiments, a device ID request may also request that the device provide information indicating whether the device can function as an originator, transponder, or observer to perform RTTOF and/or TDR_c measurements.

According to some embodiments, a data message packet may be used to transmit a device ID list. For example, a coordinator device may store a list of device IDs (and/or group IDs) that it believes are part of the system. The device ID list may be assembled from various responses to a device ID request, as described above. The coordinator transmits the device ID list to the receiving devices in the system as described above. The receiving devices them store the device ID list. According to some embodiments, the device ID list may only include device IDs that can act as originators and/or transponders for RTTOF measurements. For example, coordinator 58 of system 56 of FIG. 10 may only transmit a list of device IDs corresponding to coordinator 56 and radios 60, 62, and 64 even though other radios, such as radio 66 are present if only coordinator 56 and radios 60, 62, and 64 perform (or are capable of performing) RTTOF measurements. As another example, a coordinator device in FIG. 9 may only transmit device IDs for radios 46, 48, 50, and 52 and not for any of observers 34 if observers 34 only perform TDR measurements. Broadcasting the only the list of RTTOF-capable radios allows incoming devices, for example, a new observer 34 entering system 54 of FIG. 9, to quickly identify the devices from which the new observer can perform TDR measurements. According to some embodiments, the data message packet containing a device ID list may also include a corresponding physical location, for example, GPS coordinates for each of the devices in the list. If the radios in the device ID list are fixed radios, such as cellular telephone towers or other fixed ground-based radios, then knowing the exact location of each radio can help an observer pinpoint its location based on TDR measurements.

According to some embodiments the data message packet and/or the measurement request (or reply) packet containing the data message packet may be encrypted. Encrypting the measurement request packet, measurement reply packet, or the data message packet may increase the security of the system. For example, it precludes other devices from performing TDR or TDR_c measurements in the system because devices that cannot decrypt the packets will not be able to determine the source address or destination address, nor will the devices be able to perform complete TDR or TDR_c measurements because they will be unable to obtain the information related to the turn-around time of the transponder, any peak-error calculations, of the time-of-flight data from the completed RTTOF measurement.

Example 1—Object Coordination

According to one exemplary embodiment, the exemplary concepts described above can be used to implement object coordination on a large scale. For example, large-scale or small-scale coordination of many objects is possible with only a few transponding units, as depicted for example, in FIG. 9. The use of only a few transponding units to coordinate several objects reduces the cost of the systems. For example, transponding radios and GPS receivers may be relatively expensive as compared to radios that only receive communications (e.g., observer radios). Accordingly, a system may include relatively few, for example, four to six, transponder units that perform RTTOF measurements, and may include a theoretically unlimited number of observer units that perform TDR measurements on the RTTOF measurements of the transponder units.

According to some embodiments, each of the objects is mobile. For example, each object may consist of an unmanned vehicle, such as an unmanned aerial vehicle ("UAV") or an unmanned ground vehicle, such as a robot. In this example, the system will be described with reference to unmanned vehicles, although it is understood that other object could be substituted for the unmanned vehicles. One or more vehicles in the system may be remotely controlled, for example vehicles containing transponder radios may be remotely controlled by an operator. Some vehicles may be controlled automatically, based on the positions of other vehicles, for example, vehicles with observer-only radios may adjust their relative position to the vehicles with the transponder radios and the relative positions of the other observer-radios as explained below.

Figure 14:
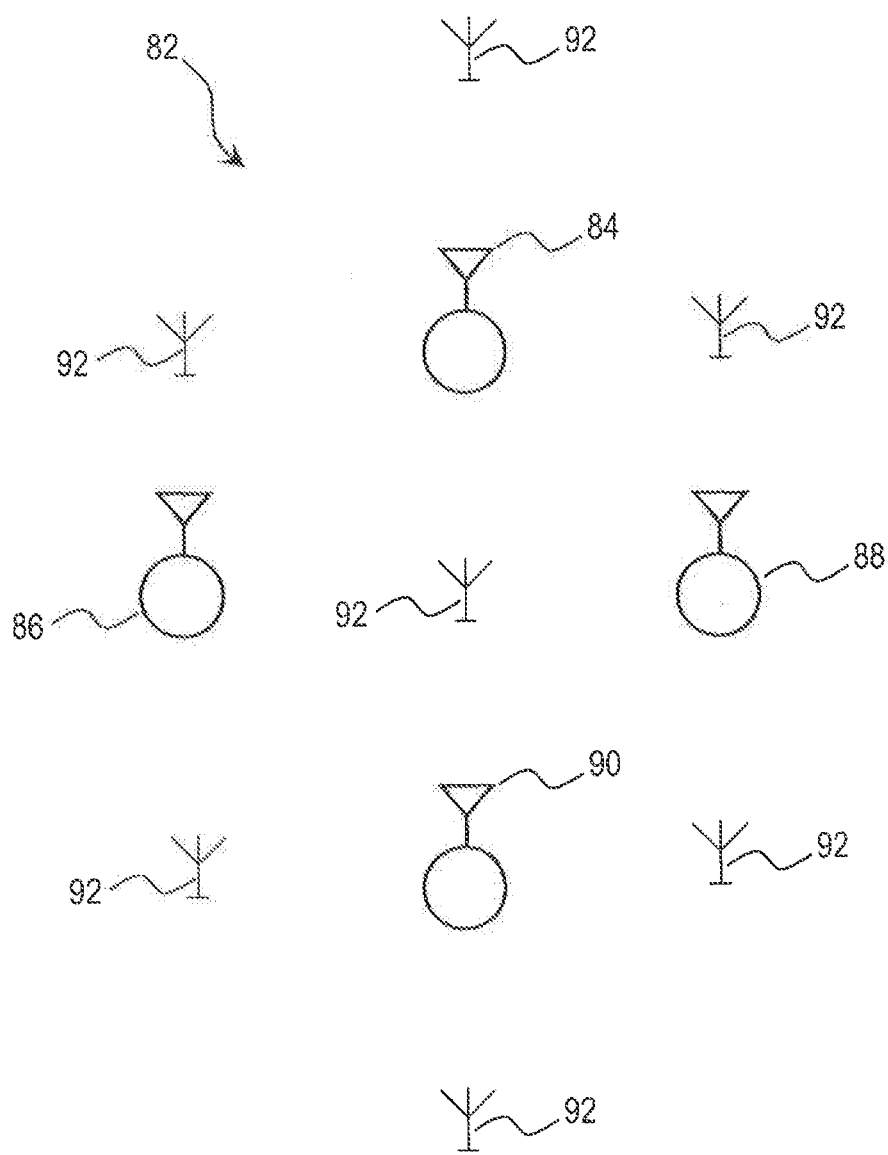
FIG. 14 is a diagram of an exemplary system for object coordination.

The system will be described with reference to system 82 of FIG. 14 The example described is not meant to be limiting of system 82 nor it is meant to confine the scope of the disclosure, but rather it illustrates one possible application of the broader concepts discussed herein.

In exemplary system 82, each of radios 84, 86, 88, 90, and 92 represent a radio attached to a vehicle. The group of vehicles in system 82 is referred to here as a "swarm" for purposes of this example. Each vehicle may be the same as all other vehicles, except for the attached radio, every vehicle may be different from each other vehicle, or some vehicles may be the same and others may be different. Radios 84, 86, 88, and 90 represent radios with transponding capabilities, while radios 92 represent observer radios. In describing FIG. 14, a coordinator (not shown) controls the RTTOF measurements. According to some embodiments, the coordinator may be a particular device, e.g., radio 84, or a device external to one or more of the radios. According to some embodiments, the coordinator may software shared by each of radios 84, 86, 88, and 90. In FIG. 14, the coordinator will be generalized abstractly, so as not to limit the description to any particular embodiment.

As described above, the coordinator instructs one of radios 84, 86, 88, and 90 to perform RTTOF measurement in up to six inter-radio pairs. For each of these RTTOF measurements, each radio 92 (e.g., observer radios) may perform a TDR_c measurement, as described above. The coordinator may then request, or instruct one of radios 84, 86, 88, or 90 to request, position data (for example, RTTOF, "raw" or uncorrected TDR data, and/or TDR_c data) from each vehicle in system 82. The coordinator may then process the position data to determine the relative position of each vehicle in the swarm and may determine the absolute position of each vehicle based on known position of coordinator 84 and/or one or more vehicle containing transponding radios 86, 88, and 90. For example, when "raw" or uncorrected TDR data is received, the coordinator uses the corresponding RTTOF measurement data to calculate TDR_c values.

Based on the position of the vehicles in the swarm, each vehicle may automatically adjust its position relative to one another. For example, if the vehicle containing radio 92 in the center of the swarm deviates toward the vehicle containing radio 84 and away from the vehicle containing radio 90, the center vehicle may adjust its speed or heading to reposition itself in the center of radios 84, 86, 88, and 90. Automatic position adjustments may be used to maintain a formation for the vehicles, such as the formation shown in FIG. 14. Other formations are contemplated; for example, the vehicles containing radios 92 may form a circular, rectangular, "V"-shaped, or diamond formation around the vehicles containing radios 84, 86, 88, and 90.

It is contemplated that system 82 is applicable for autonomous vehicles generally and also when at least one of the vehicles is remote controlled. For example, if one or more of the vehicles containing radios 84, 86, 88, and 90 is programmed to follow a specified route, such as a pre-programmed GPS-based route, the vehicles containing radios 92 may follow a similar route by maintaining their relative positions in the swarm without requiring additional hardware or software for route-programming or route-tracking. Similarly, if at least one vehicle, e.g., the vehicle containing radio 84, is a remote-controlled vehicle, such as a UAV, being remotely guided through external controls, the other vehicles, e.g., containing radios 86, 88, 90, and 92, may maintain their relative positions from the remotely-controlled vehicle based. Therefore, it is possible to coordinate the movement of many vehicles or objects where only one, or a small subset, of the vehicles determines (or knows) the route for the entire swarm.

Example 2—Approach Aid

Figure 15:
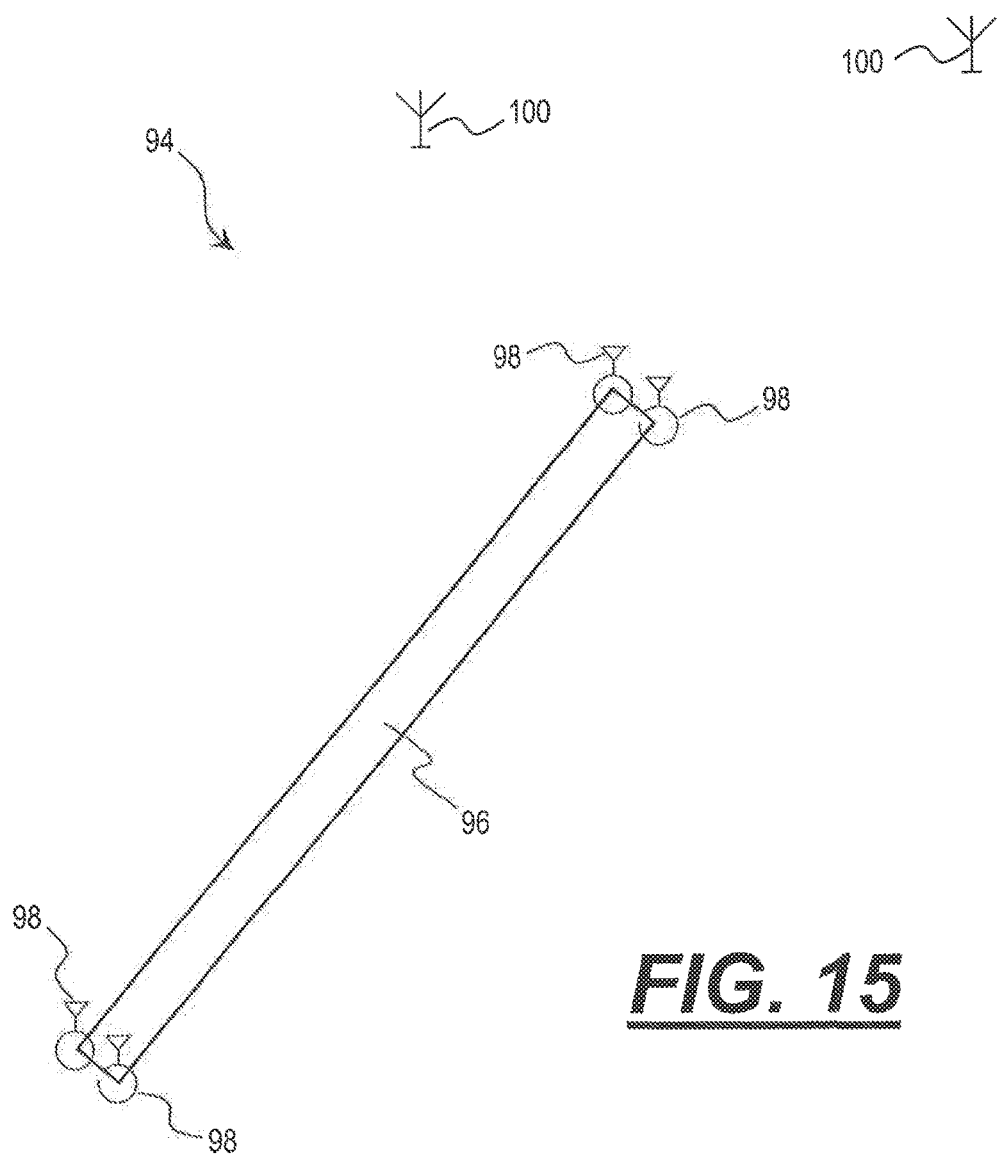
FIG. 15 is a diagram of an exemplary geolocation system for monitoring the positions of multiple objects.

FIG. 15 shows another exemplary system 94 in which TDR measurements may aid in determining the positions of approaching observer objects. FIG. 15 depicts an exemplary airport runway 96 having transponding radios 98 positioned at each corner of runway 96. It is also contemplated that transponding radios 98 may be positioned at the various locations around the airport containing runway 96, rather than on the corners of runway 96 itself. Observer radios 100 may be attached to aircraft in the vicinity of runway 96. Although an airport runway is depicted, it is contemplated that the principles described with reference to system 94 may be applied in other contexts, for example, vehicles approaching an island, harbor, building, military base, base camp, or other facility. Radios 100 may be attached to any object, for example, ships, cars, trucks, UAVs, robots, other vehicles, animals, or people.

According to some embodiments, transponder radios 98 may perform RTTOF measurements in various combinations (up to six combinations, as described above), and the aircraft containing observer radios 100 perform TDR measurements on the RTTOF measurements of transponder radios 98. Accordingly, the aircraft containing observer radios 100 can determine their relative position to the runway 96 (or the airport containing runway 96), for example, by performing TDR_c measurements, as described above.

A coordinator (not shown) may request (or issue an instruction to a radio to request) all aircraft in the area to transmit their TDR_c measurements at regular intervals (for example, once per second). The various aircraft then transmit their TDR_c measurements and their respective ID, for example the flight number for the aircraft, to the coordinator. The coordinator compiles the TDR_c data for each aircraft and determines its relative position to the airfield and may plot the location of each aircraft on a map or other visual display. In this way, an airport can efficiently track the locations of many nearby aircraft.

Because the coordinator compiles the TDR_c data, according to some embodiments, the aircraft containing radios 100 may send "raw" or uncorrected TDR data, $\Delta t_{TDR}$, and the coordinator may use the RTTOF data, or known positions of the transponder radios 98, to determine the corrected TDR_c data for each aircraft.

According to some embodiments, the coordinator may intermittently broadcast the device IDs for transponder radios 98, including the GPS locations (or other exact position coordinates) of each of transponder radios 98. Therefore, as a new aircraft approaches the airport, it can obtain the device IDs for the transponder radios 98 and their exact position and can begin performing TDR_c measurements using an observer radio 100. Knowing the exact positions of transponder radios 98, an incoming aircraft can determine its location relative to the airport, such as the angle of approach.

An approaching aircraft may also use other positioning data, such as GPS or a range measurement data with another radio at the airport, to help fix the exact position of the aircraft. This additional positioning data, or the exact position of the aircraft, may be transmitted to the coordinator along with the TDR or TDR_c measurement data.

According to some embodiments, only the exact position data of the aircraft may be transmitted to the coordinator because the aircraft can determine its precise position from the TDR_c data and other positioning data internally. Transmitting only the exact position data may decrease the size of data packets transmitted to the coordinator by an aircraft, and may decrease the processing time for the coordinator to determine the relative positions of each nearby aircraft.

Other Examples

The systems and methods described on the present disclosure are applicable to a broad range of systems. For example, radios may be mounted to any type of object. As described above, radios may be mounted to mobile or stationary vehicles, or to stationary structures, such as antenna towers. It is also contemplated that antennas may be attached to people, animals, buildings, weapons systems (such as missiles), or any other object.

According to some embodiments, observer radios may be programmed to automatically "wake-up" in response to certain events and then begin to perform TDR measurements. For example, an observer radio may be coupled to an accelerometer, and when the accelerometer registers a movement over a specified threshold, it may turn on the observer radio and instruct the radio to begin performing TDR measurements.

According to some embodiments, observers may correspond to first responder personnel or military personnel. Originators and transponders may correspond to officers, base camps, or heavy machinery, such as aircraft, trucks, personnel carriers, or tanks.

According to some embodiments, the transceiving pairs may all be fixed structures, such as ground-based towers or buildings, and all observers may be mobile objects, such as vehicles, people, or animals. According to some embodiments every radio, whether an originator, transponder, or observer, may be a mobile object.

According to some embodiments, the information gathered by the systems may be used by the object to perform automatic movement of objects. For example, an object containing a transponder or receiver may be programmed to use information by the transponder or receiver to automatically adjust its position relative to the other objects, based on TDR_c and/or RTTOF measurements. It is contemplated that each object containing a radio may be individually programmed to automatically adjust its position or that a coordinator may control the positions of objects in the system.

Further in accordance with the present disclosure, a computer-readable storage medium may contain instructions to configure a processor to perform, or to instruct a radio or device to perform, one or more of the previously described processes and methods. The computer readable medium may also be used as part of the previously described systems. For example, the computer-readable store may contain the software or instructions that, when executed by one or more processors, act as a coordinator.

The foregoing description has been presented for purposes of illustration. It is not intended to be exhaustive and does not limit the invention to the precise forms or embodiments disclosed. Modifications and adaptations of the principles of this disclosure will be apparent to those skilled in the art from consideration of the specification and practice of the disclosed embodiments. Additionally, although aspects of the disclosure are described as being stored in memory, one skilled in the art will appreciate that these aspects can also be stored on other types of computer-readable media, such as secondary storage devices, including but not limited to, hard disks, floppy disks, or CD-ROM, the Internet or other propagation medium, or other forms of RAM or ROM. Similarly, although certain aspects are described as being performed on a processor, one skilled in the art would understand that a processor may take many forms, including but not limited to, field-programmable gate arrays (FPGAs), microprocessors, application-specific integrated circuits (ASICs), integrated circuits (ICs), microprocessors, system on chip (SoC) devices, general purpose processors executing instructions stored in memory, and other processing units.

Computer programs based on the written description and methods of this disclosure are within the skill of an experienced developer. The various programs or program modules can be created using any of the techniques known to one skilled in the art or can be designed in connection with existing software. For example, program sections or program modules can be designed in or by means of Java, C, C++, or MATLAB code. Other programming languages are also contemplated.

Headings used in this description are for provided merely for convenience to facilitate description of the disclosed examples and embodiments. The headings are not limiting of the descriptions, disclosure, or examples.

Moreover, while illustrative embodiments have been described herein, the scope of the invention is defined by the scope of the claims, and includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified, including by reordering steps and/or inserting or deleting steps, without departing from the principles disclosed herein. It is intended, therefore, that the specification and examples be considered as exemplary only, with a true scope and spirit of the invention being indicated by the following claims and their full scope of equivalents.

What is claimed is:

1. A system comprising:
   an originator device configured to transmit a first wireless signal to a transponder device;
   the transponder device is configured to transmit a second wireless signal to the originator device;
   an observer device configured to receive the first wireless signal from the originator device and receive the second wireless signal from the transponder device; and
   a first processor configured to calculate a transactional difference range at the observer device based on the first wireless signal received at the observer device and the second wireless signal received at the observer device.

2. The system of claim 1, further comprising a second processor configured to calculate a round-trip time-of-flight measurement between the originator device and the transponder device using the first wireless signal and the second wireless signal.

3. The system of claim 1,
   wherein the first processor is configured to calculate the transactional difference range by subtracting a turn-around time of the transponder device from an elapsed time between receipt of a portion of the first wireless signal and receipt of a portion of the second wireless signal.

4. The system of claim 1, wherein the first wireless signal comprises a measurement request packet, the measurement request packet comprising an identifier corresponding to the transponder device, and
   wherein the second wireless signal comprises a measurement reply packet, the measurement reply packet comprising an identifier corresponding to the originator device.

5. The system of claim 1, wherein the first processor is further configured to calculate the transactional difference range at the observer device by calculating a time difference of arrival at the observer device based on when the first wireless signal is received at the observer device and when the second wireless signal is received at the observer device.

6. The system of claim 1, wherein the first processor is further configured to calculate the transactional difference range at the observer device by measuring an observer time difference, corresponding to the time period between receiving the first wireless signal at the observer device and receiving the second wireless signal at the observer device; and wherein the first processor is configured to estimate a position of the observer device using the transactional difference range.

7. The system of claim 1, wherein the first processor is further configured to calculate a corrected transactional difference range value at the observer device by subtracting a time-of-flight between the originator device and the transponder device from the transactional difference range; and wherein the first processor is further configured to estimate a position of the observer device using the corrected transactional difference range value.

8. The system of claim 1, wherein the first processor is further configured to estimate a position of the observer device using the transactional difference range.

9. An observer device comprising:

a radio device configured to receive a first wireless signal from an originator device and to receive a second wireless signal from a transponder device; and a processor configured to calculate a transactional difference range at the observer device based on the first wireless signal received at the observer device and the second wireless signal received at the observer device.

10. The observer device of claim 9, wherein the first wireless signal comprises a measurement request packet including an identifier corresponding to the transponder device; and wherein the second wireless signal comprises a measurer ent reply packet including an identifier corresponding to the originator device.

11. The observer device of claim 9, wherein the processor is further configured to calculate the transactional difference range at the observer device by calculating a time difference of arrival at the observer device based on when the first wireless signal is received at the observer device and when the second wireless signal is received at the observer device.

12. The observer device of claim 9, wherein the processor is further configured to calculate the transactional difference range by subtracting a turn-around time of the transponder device from an elapsed time between receipt of a portion of the first wireless signal and receipt of a portion of the second wireless signal.

13. The observer device of claim 9, wherein the processor is further configured to calculate the transactional difference range at the observer device by measuring an observer time difference corresponding to the time period between receiving the first wireless signal at the observer device and receiving the second wireless signal at the observer device; and wherein the processor is configured to estimate a position of the observer device using the transactional difference range.

14. The observer device of claim 9, wherein the processor is further configured to calculate a corrected transactional difference range value at the observer device by subtracting a time-of-flight between the originator device and the transponder device from the transactional difference range; and wherein the processor is further configured to estimate a position of the observer device using the corrected transactional difference range value.

15. A method comprising:

transmitting a first wireless signal from an originator device to a transponder device;

transmitting a second wireless signal from the transponder device to the originator device;

receiving the first wireless signal transmitted from the originator device at an observer device;

receiving the second wireless signal transmitted from the transponder device at the observer device; and calculating a transactional difference range at the observer device based on the first wireless signal received at the observer device and the second wireless signal received at the observer device.

16. The method of claim 15, further comprising calculating a round-trip time-of-flight measurement between the originator device and the transponder device using the first wireless signal and the second wireless signal.

17. The method of claim 15, wherein the first wireless signal comprises a measurement request packet, the measurement request packet comprising an identifier corresponding to the transponder device, and wherein the second wireless signal comprises a measurement reply packet, the measurement reply packet comprising an identifier corresponding to the originator device.

18. The method of claim 15, wherein calculating the transactional difference range at the observer device comprises subtracting a turn-around time of the transponder device from an elapsed time between receipt of a portion of the first wireless signal and receipt of a portion of the second wireless signal.

19. The method of claim 15, wherein calculating the first transactional difference range at the observer device comprises:

calculating a time difference of arrival at the observer device based on when the first wireless signal is received at the observer device and when the second wireless signal is received at the observer device.

20. The method of claim 15, wherein calculating the first transactional difference range at the observer device comprises:

measuring an observer time difference, corresponding to the time period between receiving the first wireless signal at the observer device and receiving the second wireless signal at the observer device.

21. The method of claim 15, further comprising:

calculating a corrected transactional difference range value at the observer by subtracting a time-of-flight between the originator device and the transponder device from the transactional difference range; and estimating a position of the observer device using the corrected transactional difference range value.

22. A method comprising:

receiving, at an observer device, a first wireless signal from an originator device;

receiving, at the observer device, a second wireless signal from a transponder device; and calculating a transactional difference range at the observer device based on the first wireless signal received by the observer device and the second wireless signal received by the observer device.

23. The method of claim 22, wherein the first wireless signal comprises a measurement request packet including an identifier corresponding to the transponder device and the second wireless signal comprises a measurement reply packet including an identifier corresponding to the originator device.

24. The method of claim 22, wherein calculating the transactional difference range comprises calculating a time difference of arrival at the observer device based on when the first wireless signal is received at the observer device and when the second wireless signal is received at the observer device.

25. The method of claim 22, wherein calculating the transactional difference range comprises subtracting a turn-around time of the transponder device from an elapsed time between receipt of a portion of the first wireless signal and receipt of a portion of the second wireless signal.

26. The method of claim 22, wherein calculating the transactional difference range comprises measuring an observer time difference corresponding to the time period between receiving the first wireless signal at the observer device and receiving the second wireless signal at the observer device; and the method further comprising estimating a position of the observer device using the transactional difference range.

27. The method of claim 22, further comprising:

calculating a corrected transactional difference range value at the observer device by subtracting a time-of-flight between the originator device and the transponder device from the transactional difference range; and estimating a position of the observer device using the corrected transactional difference range value.

* * * * *

UNITED STATES PATENT AND TRADEMARK OFFICE
CERTIFICATE OF CORRECTION

PATENT NO. : 10,094,908 B2
APPLICATION NO. : 15/584475
DATED : October 9, 2018
INVENTOR(S) : David W. A. Taylor, Jr. et al.

Page 1 of 1

It is certified that error appears in the above-identified patent and that said Letters Patent is hereby corrected as shown below:

In the Claims

Claim 10, Column 43, Line 34-35, "measurer ent" should read as -- measurement --.

Signed and Sealed this
Fourth Day of December, 2018

Andrei Iancu
*Director of the United States Patent and Trademark Office*